US011614806B1

United States Patent
Cihan et al.

(10) Patent No.: US 11,614,806 B1
(45) Date of Patent: Mar. 28, 2023

(54) INPUT DEVICE WITH SELF-MIXING INTERFEROMETRY SENSORS

(71) Applicant: Apple Inc., Cupertino, CA (US)

(72) Inventors: Ahmet Fatih Cihan, San Jose, CA (US); Adrian Z. Harb, San Jose, CA (US); Mengshu Huang, Cupertino, CA (US); Stephen Eric Dey, San Diego, CA (US); Yuhao Pan, Sunnyvale, CA (US); Mehmet Mutlu, San Jose, CA (US); Tong Chen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/319,010

(22) Filed: May 12, 2021

(51) Int. Cl.
| | |
|---|---|
| *G06F 3/0354* | (2013.01) |
| *G06F 3/04883* | (2022.01) |
| *G06F 3/041* | (2006.01) |
| *G06F 3/03* | (2006.01) |
| *G06F 3/043* | (2006.01) |
| *G06F 3/046* | (2006.01) |

(52) U.S. Cl.
CPC ........ *G06F 3/03542* (2013.01); *G06F 3/0317* (2013.01); *G06F 3/04162* (2019.05); *G06F 3/04883* (2013.01); *G06F 3/043* (2013.01); *G06F 3/046* (2013.01); *G06F 2203/04101* (2013.01)

(58) Field of Classification Search
CPC ...... G06F 3/048; G06F 3/0482; G06F 3/0481; G06F 9/451; G06F 3/167; G06F 3/0484; G06F 3/04886; G06F 3/017; G06F 3/0354
See application file for complete search history.

(56) References Cited

U.S. PATENT DOCUMENTS

| 5,483,261 A | 1/1996 | Yasutake |
| 5,488,204 A | 1/1996 | Mead et al. |
| (Continued) | | |

FOREIGN PATENT DOCUMENTS

| CN | 1531706 A | 9/2004 |
| CN | 1659505 A | 8/2005 |
| (Continued) | | |

OTHER PUBLICATIONS

Final Office Action received for U.S. Appl. No. 15/650,512, dated Feb. 26, 2019, 27 pages.

(Continued)

*Primary Examiner* — Olga V Merkoulova
(74) *Attorney, Agent, or Firm* — Kubota & Basol LLP

(57) ABSTRACT

Self-mixing interferometry (SMI) sensors can be used for generation of content using an input device without requiring a touch-sensitive surface. In some examples, the SMI sensors can be used to detect characteristics of the input device including position, orientation, and/or motion of the input device and/or force applied by the input device (e.g., force applied by a stylus tip). In some examples, some or all of the characteristics of the input device can be used in processing to generate content, including textual character input and three-dimensional objects. In some examples, the generation of content can use information from one or more additional sensors for the input device and/or from additional devices in combination with the characteristics of the input device based on the SMI sensors for generation of content.

22 Claims, 16 Drawing Sheets

TOP VIEW

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,212,296 B1 | 4/2001 | Stork et al. | |
| 6,310,610 B1 | 10/2001 | Beaton et al. | |
| 6,323,846 B1 | 11/2001 | Westerman et al. | |
| 6,348,914 B1 | 2/2002 | Tuli | |
| 6,437,314 B1* | 8/2002 | Usuda | G06F 3/03545 178/19.05 |
| 6,441,807 B1 | 8/2002 | Yamaguchi | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,268,774 B2 | 9/2007 | Pittel et al. | |
| 7,646,379 B1 | 1/2010 | Drennan et al. | |
| 7,663,607 B2 | 2/2010 | Hotelling et al. | |
| 7,835,013 B2 | 11/2010 | Jones et al. | |
| 7,852,318 B2 | 12/2010 | Altman | |
| 7,880,726 B2 | 2/2011 | Nakadaira et al. | |
| 8,456,419 B2 | 6/2013 | Wilson | |
| 8,479,122 B2 | 7/2013 | Hotelling et al. | |
| 8,624,859 B2 | 1/2014 | Aono | |
| 8,692,979 B2 | 4/2014 | Moench et al. | |
| 8,922,530 B2 | 12/2014 | Pance | |
| 9,262,033 B2 | 2/2016 | Idzik et al. | |
| 10,555,079 B2 | 2/2020 | Bakish | |
| 10,557,701 B2 | 2/2020 | Jiang et al. | |
| 10,771,884 B2 | 9/2020 | Mutlu et al. | |
| 10,871,820 B2 | 12/2020 | Mutlu et al. | |
| 2004/0150631 A1 | 8/2004 | Fleck et al. | |
| 2004/0189620 A1 | 9/2004 | Roh et al. | |
| 2004/0239702 A1 | 12/2004 | Kang et al. | |
| 2005/0150697 A1 | 7/2005 | Altman et al. | |
| 2006/0197753 A1 | 9/2006 | Hotelling | |
| 2007/0003168 A1 | 1/2007 | Oliver | |
| 2007/0107744 A1 | 5/2007 | Dilbeck et al. | |
| 2008/0018591 A1 | 1/2008 | Pittel et al. | |
| 2011/0164000 A1* | 7/2011 | Pance | G06F 3/038 345/179 |
| 2012/0280948 A1 | 11/2012 | Barrus et al. | |
| 2013/0021244 A1* | 1/2013 | Kuge | G06F 3/0317 345/157 |
| 2014/0085635 A1* | 3/2014 | Van Der Lee | G01P 5/26 356/342 |
| 2014/0192028 A1* | 7/2014 | Leydon | G06F 3/03545 345/179 |
| 2014/0327658 A1* | 11/2014 | Vardi | G06K 9/24 345/179 |
| 2015/0160851 A1 | 6/2015 | Michihata et al. | |
| 2015/0286293 A1* | 10/2015 | Gruhlke | G06F 3/03542 345/182 |
| 2016/0073886 A1* | 3/2016 | Connor | A61B 5/6887 600/475 |
| 2016/0092728 A1 | 3/2016 | Tsutsui | |
| 2017/0309057 A1* | 10/2017 | Vaganov | H04N 13/20 |
| 2017/0358144 A1 | 12/2017 | Schwarz et al. | |
| 2018/0018057 A1* | 1/2018 | Bushnell | G06F 3/017 |
| 2019/0155411 A1* | 5/2019 | Kinrot | G06F 3/04883 |
| 2019/0313178 A1* | 10/2019 | Mutlu | G01S 17/08 |
| 2020/0200522 A1 | 6/2020 | Huang et al. | |
| 2020/0319082 A1 | 10/2020 | Mutlu et al. | |
| 2021/0010797 A1 | 1/2021 | Cihan et al. | |
| 2021/0011559 A1 | 1/2021 | Mutlu et al. | |
| 2021/0026464 A1 | 1/2021 | Yamada et al. | |
| 2021/0072833 A1* | 3/2021 | Mutlu | G01S 17/32 |

FOREIGN PATENT DOCUMENTS

| | | |
|---|---|---|
| CN | 103353793 A | 10/2013 |
| CN | 105378585 A | 3/2016 |
| JP | 2000-163031 A | 6/2000 |
| JP | 2002-342033 A | 11/2002 |
| WO | 2002/039421 A1 | 5/2002 |
| WO | 2002/097721 A2 | 12/2002 |

OTHER PUBLICATIONS

First Action Interview received for U.S. Appl. No. 15/650,512, dated Dec. 3, 2018, 5 pages.

Non-Final Office Action received for U.S. Appl. No. 15/650,512, dated Aug. 29, 2019, 5 pages.

Notice of Allowance received for U.S. Appl. No. 15/650,512, dated Jan. 21, 2020, 9 pages.

Preinterview First Office Action received for U.S. Appl. No. 15/650,512, dated Sep. 17, 2018, 5 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

TOP VIEW

TOP VIEW

TOP VIEW

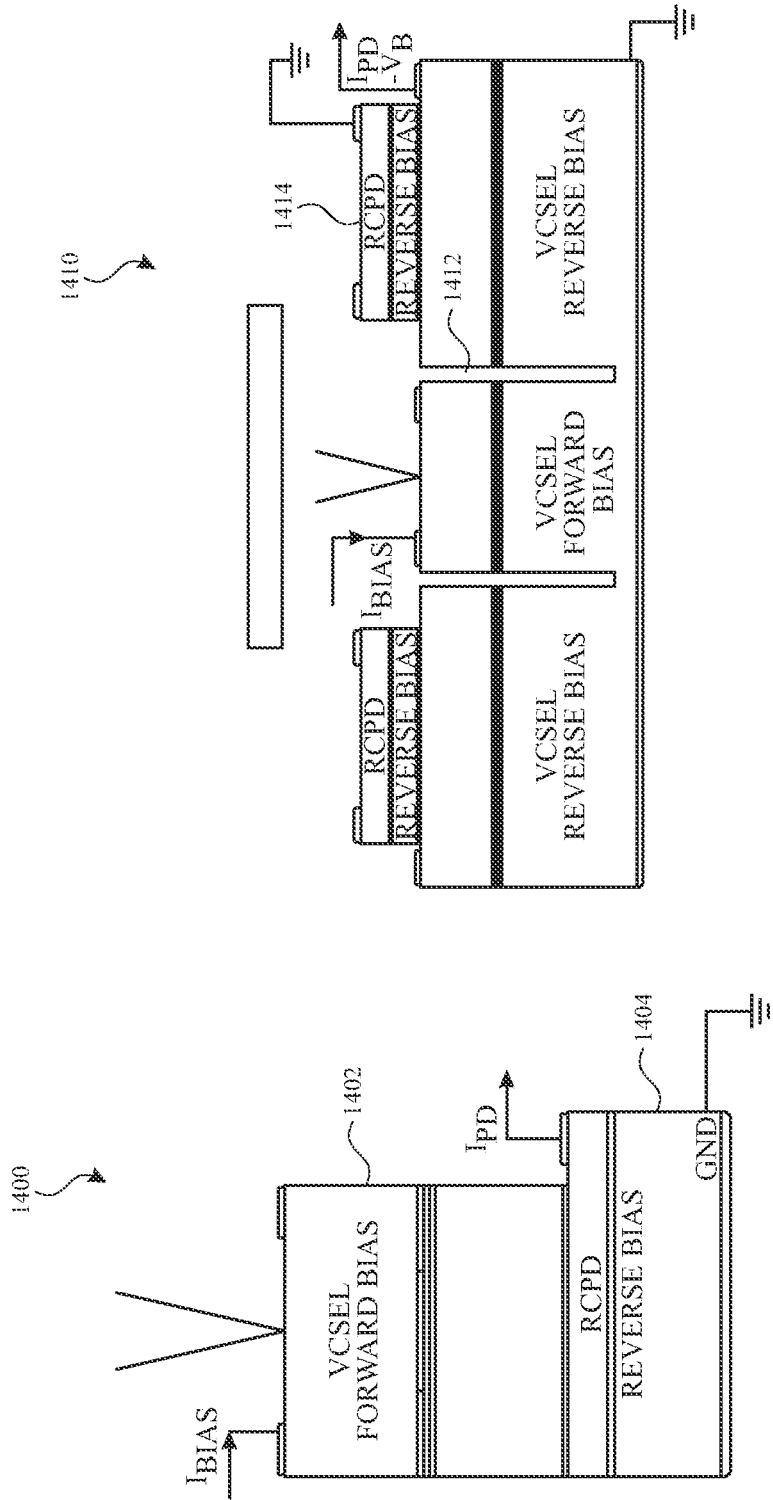

INPUT DEVICE WITH SELF-MIXING INTERFEROMETRY SENSORS

FIELD OF THE DISCLOSURE

This relates generally to input devices, and more particularly to input devices including self-mixing interferometry sensors.

BACKGROUND OF THE DISCLOSURE

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision of stylus input. However, such styli require a touch-sensitive surface in order to generate content.

SUMMARY OF THE DISCLOSURE

This relates to an input device including self-mixing interferometry (SMI) sensors that can be used for generation of content using the input device without requiring a touch-sensitive surface. In some examples, the SMI sensors can be used to detect characteristics of the input device including position, orientation, and/or motion of the input device and/or force applied by the input device (e.g., force applied by a stylus tip). In some examples, some or all of the characteristics of the input device can be used in processing to generate content, including textual character input and three-dimensional objects. In some examples, the generation of content can use information from one or more additional sensors for the input device and/or from additional devices in combination with the characteristics of the input device based on the SMI sensors for generation of content.

BRIEF DESCRIPTION OF THE DRAWINGS

FIGS. 14A-14D illustrate example SMI sensors according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to an input device including self-mixing interferometry (SMI) sensors that can be used for generation of content using the input device without requiring a touch-sensitive surface. In some examples, the SMI sensors can be used to detect characteristics of the input device including position, orientation, and/or motion of the input device and/or force applied by the input device (e.g., force applied by a stylus tip). In some examples, some or all of the characteristics of the input device can be used in processing to generate content, including textual character input and three-dimensional objects. In some examples, the generation of content can use information from one or more additional sensors for the input device and/or from additional devices in combination with the characteristics of the input device based on the SMI sensors for generation of content.

Figure 1A:
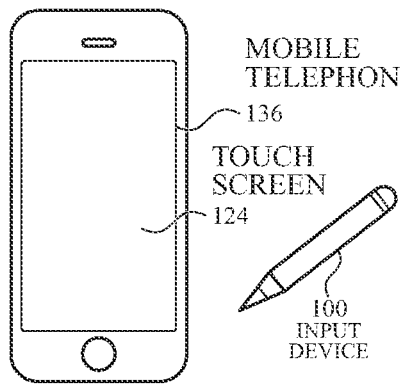
FIGS. 1A-1E illustrate example systems that can include a touch screen according to examples of the disclosure.
Figure 1B:
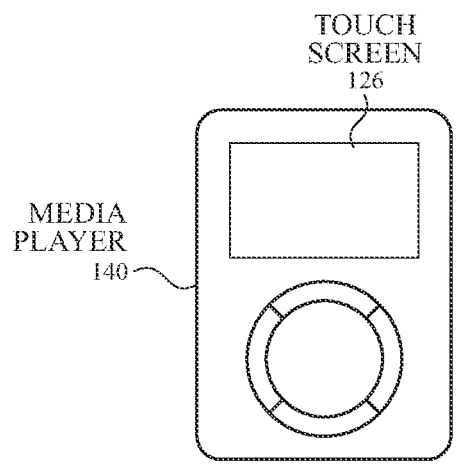
Figure 1C:
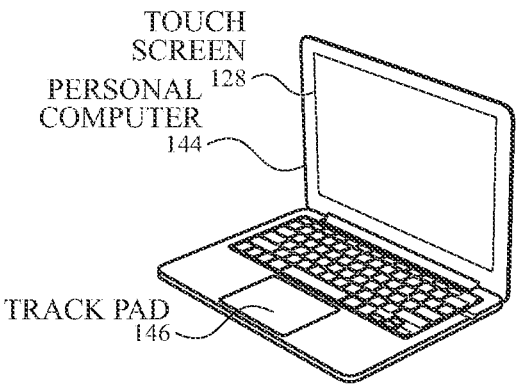
Figure 1D:
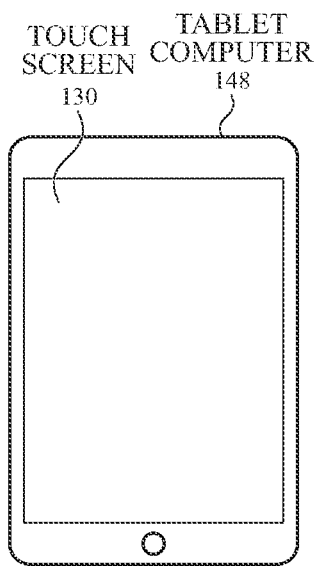
Figure 1E:
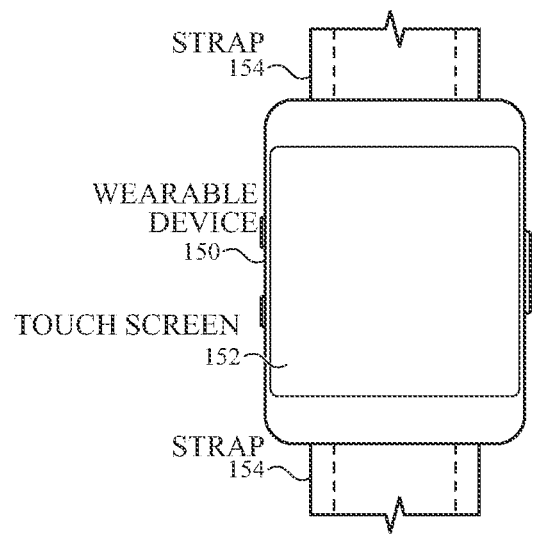

FIGS. 1A-1E illustrate examples of systems with touch screens that can accept input from an input device 100, such as an active stylus, via a touch-sensitive surface and/or via a non-touch-sensitive surface according to examples of the disclosure. FIG. 1A illustrates an exemplary mobile telephone 136 that includes a touch screen 124 that can accept input from an input device, such as an active stylus, via a touch-sensitive surface (e.g., touch screen 124) and/or via a non-touch-sensitive surface according to examples of the disclosure. FIG. 1B illustrates an example digital media player 140 that includes a touch screen 126 that can accept input from an input device, such as an active stylus, via a touch-sensitive surface (e.g., touch screen 126) and/or via a non-touch-sensitive surface according to examples of the disclosure. FIG. 1C illustrates an example personal computer 144 that includes a touch screen 128 that can accept input from an input device, such as an active stylus, via a touch-sensitive surface (e.g., touch screen 128) and/or via a non-touch-sensitive surface according to examples of the disclosure. FIG. 1D illustrates an example tablet computing device 148 that includes a touch screen 130 that can accept input from an input device, such as an active stylus, via a touch-sensitive surface (e.g., touch screen 130) and/or via a non-touch-sensitive surface according to examples of the disclosure. FIG. 1E illustrates an example wearable device 150 (e.g., a watch) that includes a touch screen 152 that can accept input from an input device, such as an active stylus, via a touch-sensitive surface (e.g., touch screen 152) and/or via a non-touch-sensitive surface according to examples of the disclosure. Wearable device 150 can be coupled to a user via strap 154 or any other suitable fastener. It should be understood that the example devices illustrated in FIGS. 1A-1E are provided by way of example, and other devices can accept input from an input device, such as an active stylus, via a touch-sensitive surface and/or via a non-touch-sensitive surface according to examples of the disclosure. Additionally, although the devices illustrated in FIGS. 1A-1E include touch screens, in some examples, the devices may have a non-touch sensitive display. As described in more detail below, the input device and computing device can include additional input/output (TO) capabilities to enable input from the input device via a non-touch-sensitive surface.

In some examples, touch screens 124, 126, 128, 130 and 150 can be can be based on self-capacitance. A self-capacitance based touch system can include a matrix of small, individual plates of conductive material or groups of individual plates of conductive material forming larger conductive regions that can be referred to as touch electrodes or as touch node electrodes. For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include electrodes arranged as drive and sense lines that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 152 can be based on mutual capacitance and/or self-capacitance. The electrodes can be arrange as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
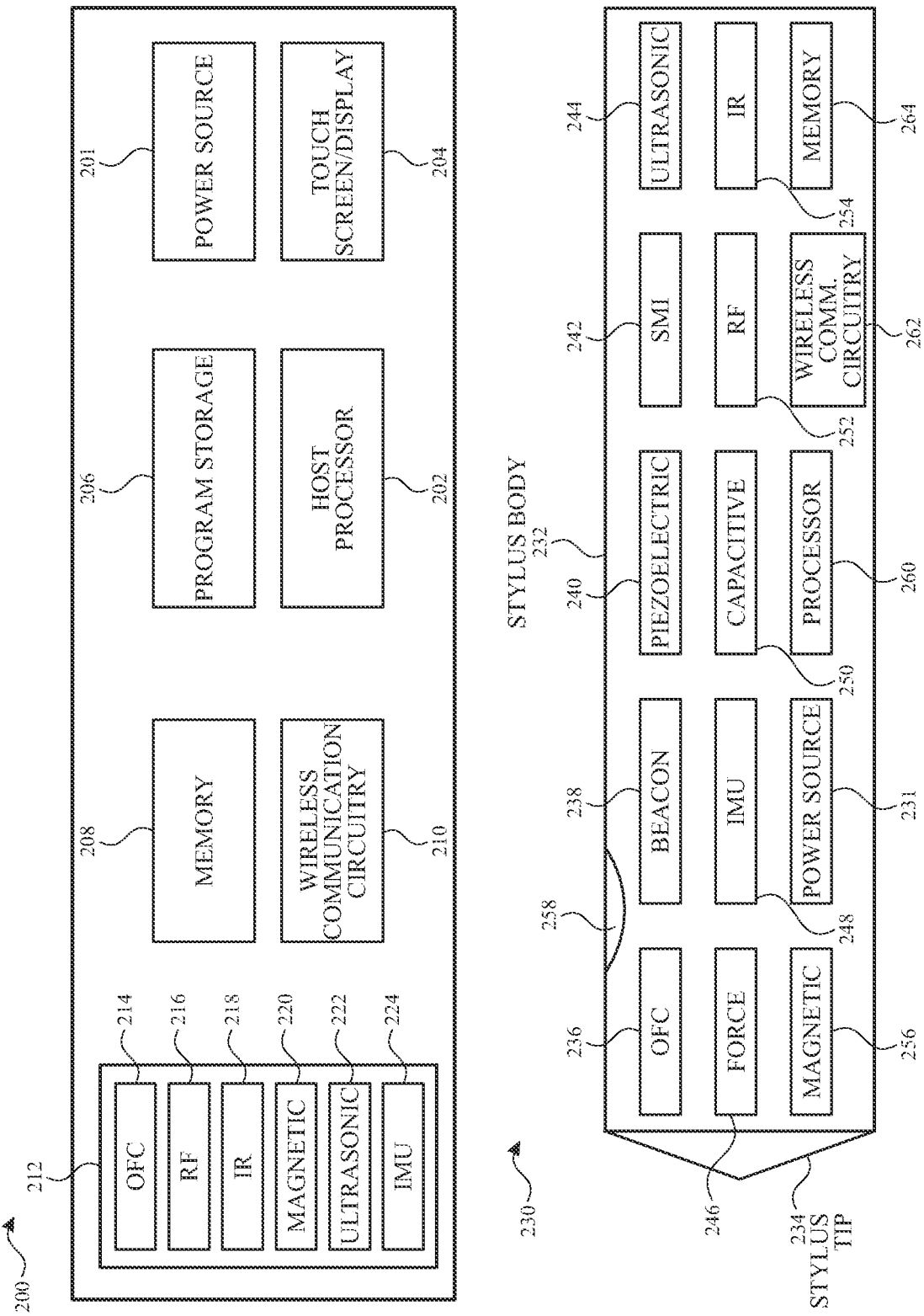
FIG. 2 illustrates a block diagram of an example system including an example computing system and an example input device according to examples of the disclosure.

FIG. 2 illustrates a block diagram of an example system including an example computing system 200 and an example input device 230 according to examples of the disclosure. Computing system 200 can receive input from input device 230, such as an active stylus, and render content for display generated using the input device, such as writing or drawing by a stylus. Computing system 200 can be included in, for example, mobile telephone 124, digital media player 140, personal computer 128, tablet computing device 130, wearable device 150, or any mobile or non-mobile computing device that includes a display. In some examples, wearable device 150 can be an AR/VR system with head-mounted display.

In some examples, computing system 200 can include an integrated touch screen 204 to display images and to detect touch and/or proximity (e.g., hover) events from an object (e.g. active or passive stylus or finger) at or proximate to the surface of the touch screen 204. In some examples, touch screen 204 can be configured to display content generated using input device 230 (e.g., writing or drawings on a non-touch sensitive surface, or on the touch sensitive surface of touch screen 204). In some examples, computing system 200 can include a non-touch sensitive display configured to display content generated using the input device (e.g., writing or drawings on a non-touch sensitive surface).

In some examples, computer system 200 can include a power source 201 (e.g., energy storage device such as a battery), host processor 202, program storage device 206 and/or memory 208, wireless communication circuitry 210, and sensor device(s) 212. Host processor 202 can control some or all of the operations of computer system 200. Host processor 202 can communicate, either directly or indirectly, with some or all of the other components of the computer system 200. For example, a system bus or other communication mechanism can provide communication between power source 201, the host processor 202, touch screen or display 204, program storage device 206, memory 208, wireless communication circuitry 210, and sensor device(s) 212.

Host processor 202 can be implemented as any electronic device capable of processing, receiving, or transmitting data or instructions, whether such data or instructions is in the form of software or firmware or otherwise encoded. For example, the host processor 202 can include a microprocessor, a central processing unit (CPU), an application-specific integrated circuit (ASIC), a digital signal processor (DSP), a controller, or a combination of such devices. As described herein, the term "processor" or "processing circuitry" is meant to encompass a single processor or processing unit, multiple processors, multiple processing units, or other suitably configured computing element or elements. In some cases, host processor 202 can provide part or all of the processing systems or processors described with reference to any of FIGS. 3-18.

Host processor 202 can receiving touch input to touch screen 204 or other input devices and performing actions based on the outputs. For example, host processor 202 can be connected to program storage 206 (and/or memory 208) and a display controller/driver to generate images on the display screen. The display screen includes, but is not limited to, Liquid Crystal Display (LCD) displays, Light-Emitting Diode (LED) displays, including Organic LED (OLED), Active-Matrix Organic LED (AMOLED), Passive-Matrix Organic LED (PMOLED) displays, a projector, a holographic projector, a retinal projector, or other suitable display. In some examples, the display driver can provide voltages on select (e.g., gate) lines to each pixel transistor and can provide data signals along data lines to these same transistors to control the pixel display image for touch screen 204.

Host processor 202 can cause a display image on touch screen 204, such as a display image of a user interface (UI) or display image of content generated using input device 230, and can use touch processor and/or touch controller to detect a touch on or near touch screen 204, such as a touch input to the displayed UI when computing system 200 includes a touch screen. The touch input can be used by computer programs stored in program storage 206 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 202 can also perform additional functions that may not be related to touch processing.

Note that one or more of the functions described in this disclosure can be performed by firmware stored in memory 208 and/or stored in program storage 206 and executed by host processor 202 or other processing circuitry of computing device 200. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, program storage 206 and/or memory 208 can be a non-transitory computer readable storage medium. The non-transitory computer readable storage medium (or multiple thereof) can have stored therein instructions, which when executed by host processor 202 or other processing circuitry, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The power source 201 can be implemented with any device capable of providing energy to computing system 200. For example, the power source 201 can include one or more batteries or rechargeable batteries. Additionally or alternatively, the power source 201 can include a power connector or power cord that connects computing system 200 to another power source, such as a wall outlet.

Memory 208 can store electronic data that can be used by computing system 200. For example, memory 208 can store electrical data or content such as, for example, audio and video files, documents and applications, device settings and user preferences, timing signals, control signals, and data structures or databases. Memory 208 can include any type of memory. By way of example only, memory 208 can include random access memory, read-only memory, Flash memory, removable memory, other types of storage elements, or combinations of such memory types.

Sensing device(s) 212 can include sensors circuitry configured to sense one or more types of parameters, such as but not limited to, vibration; light; touch; force; heat; movement; relative motion; biometric data (e.g., biological parameters) of a user; air quality; proximity; position; connectedness; and so on. In some examples, sensing device(s) 212 can include an image sensor such as an outward facing camera 214, a radiofrequency sensor (and/or transmitter) 216, an infrared sensor (and/or transmitter) 218, a magnetic sensor (and/or generator) 220 (e.g., a magnetometer), an ultrasonic sensor (and/or transmitter) 222, and/or an inertial measurement unit 224. It should be understood the FIG. 2 illustrates some example sensors of sensing device(s) 212, but that the sensors are not so limited. In some examples, the sensing device(s) 212 can further include other sensor(s) including a heat sensor, a position sensor, a light or optical sensor, an accelerometer, a pressure transducer, a gyroscope, an acoustic sensor, a health monitoring sensor, and/or an air quality sensor, among other possibilities. Additionally, the one or more sensors o sensing device(2) 212 can utilize any suitable sensing technology, including, but not limited to, interferometric, magnetic, capacitive, ultrasonic, resistive, optical, acoustic, piezoelectric, or thermal technologies.

Wireless communication circuitry 212 can transmit or receive data from another electronic device, such as from input device 230. Although wireless communication circuitry 22212 is illustrated and described, it is understood that other wired communication interfaces may be used. In some examples, the wireless and/or wired communications interfaces can include, but are not limited to, cellular, Bluetooth, and/or Wi-Fi communications interfaces. Although not shown, computing system 200 can also include other input/output mechanisms including one or more touch sensing input surfaces, a crown, one or more physical buttons, one or more microphones or speakers, one or more ports such as a microphone port, and/or a keyboard. Additionally or alternatively, Input device 230 can including a housing. In some examples, the housing of a stylus input device can include a cylindrical body 232 (referred to herein as a stylus body 232) with a tip portion (referred to herein a stylus tip 234 or tip portion) at the distal end. In some examples, the tip portion 234 can be part of a unibody housing and in some examples, the tip portion 234 can be removable from the cylindrical body 232. The housing can include an ergonomic depression 258 (or multiple ergonomic depressions) as a guide for placement of one of a user's fingers (e.g., thumb or index finger). The ergonomic depression 258 (also referred to herein as a notch or guide) can result in the orientation of the input device in a range of positions with respect to a user's hand and finger gestures. The circuitry of the input device 230 can be disposed in the housing. For example, the circuitry can include, a power source 231 (e.g., battery), processing circuitry (e.g., processor 260), memory 264, wireless communication circuitry 262 and various sensors. The sensors can include, SMI sensors 242, among other possible sensors. In some examples, input device 230 can include an outward facing camera 236, a beacon transmitter 238 (e.g., using any electromagnetic signals), an ultrasonic sensor (and/or transmitter) 244, a force sensor 246 (e.g., such as a strain gauge, capacitive gap force sensor, a piezoelectric sensor 240), an IMU 248 (and/or other motion or orientation device such as an accelerometer or gyroscope), a capacitive electrode or other capacitive sensor 250, a radiofrequency sensor (and/or transmitter) 252, infrared sensor (and/or transmitter) 254, a magnetic sensor (and/or generator) 220, among other suitable sensors. Processor 260 can communicate, either directly or indirectly, with some or all of the other components of input device 230. For example, a system bus or other communication mechanism can provide communication between the various components of input device 230.

As described herein, in some examples, motion and/or position of input device 230 can be tracked to generate input for computing system 200. In some examples, position and/or motion of input device 230 can be tracked using SMI sensors 242. For example, input device 230 can include a plurality of SMI sensors 242. In some examples, input device 230 can be a stylus and the plurality of SMI sensors 242 can be disposed in the distal end of the stylus, such as in proximity the stylus tip 234. The SMI sensors 242 can be configured to both transmit and receive light (e.g., emitting and receiving a laser beam), which can provide data about the position and movement of the stylus tip 234 relative to a non-touch-sensitive surface.

In some examples, tracking the position and/or motion of input device 230 using the SMI sensors 242 can be augmented with additional sensors. For example, the sensor device(s) 212 and or the various sensors of input device 230 can track information about the input device 230 (e.g. position, motion, orientation, force, etc. of the input device) and the information can be transferred from the one or more sensor device(s) 212 to the host processor 202. The information from the input device (e.g., received via wireless communication circuitry 210, 262) and the one or more sensor device(s) 212 can be stored in memory 208, in some examples. The information can be processed by host processor 202 to render and/or display content on the display 204 from the input device 230 (e.g., rendering writing or drawing by a stylus input device on non-touch sensitive surfaces on the display). In some examples, the information about the input device can be gathered by, transferred to, processed by and/or stored on the stylus. For example, one or more sensing modalities within the input device can provide additional information about input device force, orientation, motion, and/or position. The combined information from the SMI sensors and the one or more sensing modalities can then be transferred to, processed by, and/or stored on a computing device to render and/or display content on the display according to examples of the disclosure. In some examples, a computing device can render content in three-dimensional environment based on position and/or motion of an input device. For example, system 200 can be a head-mounted augmented and/or virtual reality headset that can render and overlay content over a real-world environment or a representation of a real-world environment captured by outward facing cameras 214.

It should be apparent that the architecture shown in FIG. 2 is only one example architecture of computing system 200 and input device 230, and that the system could have more or fewer components than shown, or a different configuration of components. The various components shown in FIG. 2 can be implemented in hardware, software, firmware or any combination thereof, including one or more signal processing and/or application specific integrated circuits.

Figure 3:
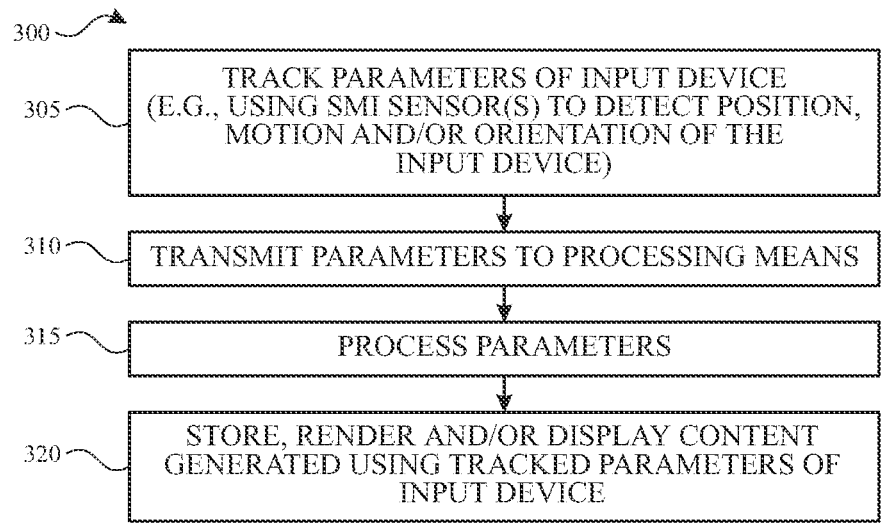
FIG. 3 illustrates an example process for generating content with an input device on a non-touch sensitive surface according to examples of the disclosure.

As described herein, in some examples, an input device including SMI sensors can be used for input on a non-touch sensitive surface. FIG. 3 illustrates an example process 300 for generating content with an input device on a non-touch sensitive surface according to examples of the disclosure. At 305, one or more parameters associated with the input device can be detected and/or tracked. In some examples, the parameters associated with the input device can detected and/or tracked at least partially using SMI sensors. In some examples, the one or more parameters can include a position of the input device, motion of the input device, orientation of the input device, and force information, among other parameters. In some examples, the SMI sensors can be used to track motion of a stylus tip 234 relative to a non-touch sensitive surface to determine two-dimensional or three-dimensional displacement and distance of the stylus tip relative to the non-touch sensitive surface. In some examples, force information can represent contact between the input device (e.g., stylus tip 234), measured using force sensor 246. In some examples, the force data can be represented as variable force measurements, such as raw data representative of the force applied to the stylus tip 234. In some examples, the force data can be represented as a binary measurement, in which a force measurement above a first threshold can result in a report of a contact and a force measurement below a second threshold can result in a break of contact with the surface. In some examples, the first and second thresholds can be the same. In some examples, the first and second thresholds can be different to provide a level of hysteresis and avoid high frequency transitions between detecting an initiation or break in contact.

At 310, the parameters associated with the input device—optionally including position, motion, and/or orientation of the input device—can be transmitted to processing means. At 315, the parameters associated with the input device can be processed by the processing means. In some examples, the processing means can include processor 260 which can be configured to process the parameters from the SMI sensors into processed parameters. For example, the parameters associated with the input device that are detected and/or tracked by the SMI sensors of the input device can include a velocity and distance measurement for each SMI sensor, and the processor 260 can convert these velocity and distance measurements into two-dimensional, three-dimensional, four-dimensional, five-dimensional, or six dimensional displacement parameters (e.g., x, y, and z relative displacement, tilt, orientation and/or axial rotation). In some examples, the parameters tracked by the SMI sensors can be processed along with other parameters associated with the input device that are detected and/or tracked by other sensors of the input device to generate processed parameters. In some examples, the processing means can include processor 260 and/or host processor 202, which can be configured to process the parameters from the SMI sensors into processed parameters. For example, the parameters associated with the input device that are detected and/or tracked by the SMI sensors of the input device (optionally processed in part by processor 260) can be transmitted to host processor 202 for processing by a different computing device (e.g., computing system 200) to generate processed parameters. In some examples, the processing circuitry of the different computing device (e.g., host processor 202) can be configured to process the parameters associated with the input device that are received from the input device and the parameters detected and/or tracked by sensor device(s) of the computing device.

At 320, processed parameters associated with the input device can be stored in memory in one or both of the input device and a different computing device (e.g., in memory 208 or 264). For example, the results of processing by processor 260 can be stored in memory 264 and/or transmitted to computing system 200 for storage, rendering and/or display of input device content (e.g., writing or drawing) based on the tracked and processed parameters of the input device. Additionally or alternatively, in some examples, the parameters can be transferred between the input device and the computing device (e.g., using wired or wireless communication circuitry). The tracked input device parameters can be stored and/or processed to generate content at the computing device that can be rendered on the display.

In some examples, the detection and/or tracking of one or more parameters can be performed when the input device is not touching or proximate to a touch-sensitive surface of a computing device (e.g., disabled when over or touching a touch screen 204). In some examples, the detection and/or tracking of one or more parameters can be performed when the different computing device detects the input device in proximity with a non-touch sensitive surface and/or when the different computing device detects a hand holding the input device in a pose and/or with an orientation indicative of intended input by the user of the input device.

Figure 4:
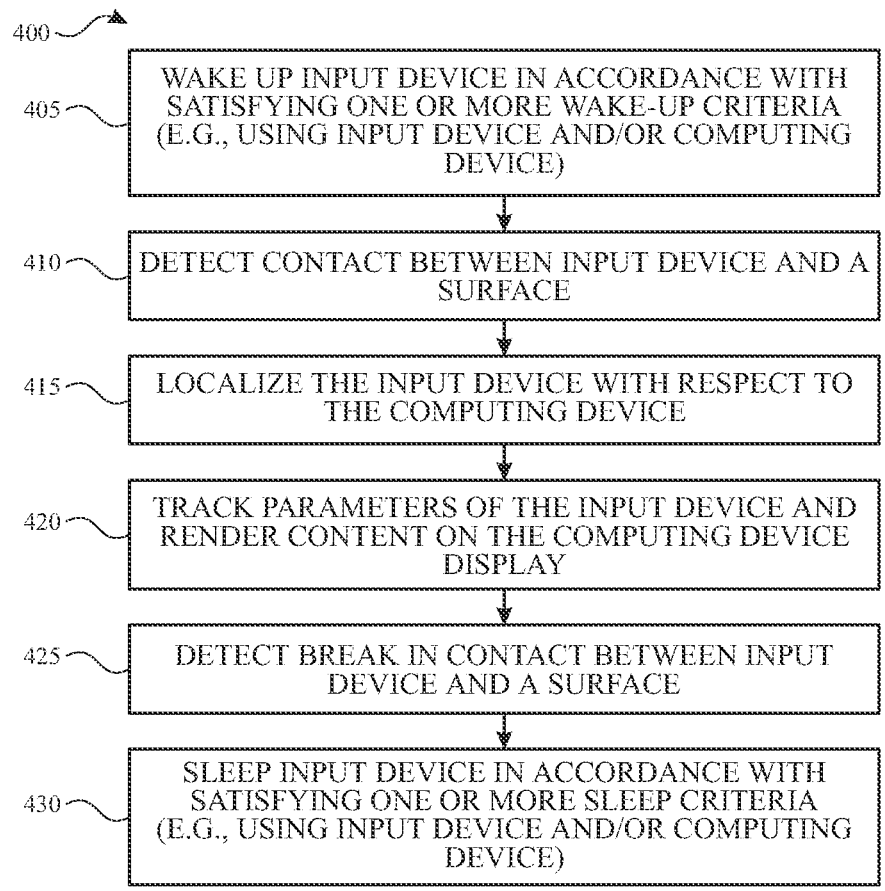
FIG. 4 illustrates an example process for generating content with more one or more input devices on a non-touch sensitive surface according to some examples of the disclosure.

As described herein, in some examples, a system including an input device with SMI sensors and a computing device including a display (e.g., a head-mounted display device) can be used for rendering content on the display based on input from the input device on a non-touch sensitive surface. FIG. 4 illustrates an example process 400 for generating content with more one or more input devices on a non-touch sensitive surface according to some examples of the disclosure. At 405, the input device can be activated (woken up) in accordance with satisfying one or more activation criteria. In some examples, activating or waking-up the input device can cause the SMI sensors to be powered on to measure parameters of the input device, can cause an input device processor to be powered on to process the data from the SMI sensors and/or power on the communication circuitry to transmit data from the input device to a different computing device. In some examples, activating or waking-up the input device can refer to configuring the SMI sensor scans to run at a different scan rate (e.g., more frequently) or at a different (e.g., higher) resolution of SMI scan, configuring the wireless communication circuitry to operate at a different power level or rate (e.g., increasing the power and/or rate of communication), and/or configuring the processing circuitry to operate at a different power level or rate (e.g., increasing the power and/or processing rate), among other possibilities.

In some examples, the one or more activation criteria can be based on detecting and/or tracking one or more parameters associated with the input device indicative of a change in an operating state of input device. In some examples, the activation criteria can be related to one or more sensors of the input device. For example, as discussed previously, the input device can include a force sensor (e.g., force sensor 240, piezoelectric sensor 246) configured to detect force above a threshold indicative of a user holding the input device (e.g., a force-based activation criterion that is satisfied when the amount of force is above a threshold, and not satisfied when the force threshold is below the threshold). In some examples, the force sensor can be a strain gauge or piezoelectric sensor (e.g., corresponding to piezoelectric sensor 246). In some examples, the force sensor can be disposed beneath ergonomic depression 252 in the stylus body 232. In some examples, the force sensor can be disposed in other regions around the stylus body 232. Additionally or alternatively, in some examples, one or more SMI sensors can also be configured as a force sensor. The one or more SMI sensors can also be configured to measure force in combination with one or more force sensors (e.g. force sensor 240, piezoelectric sensor 246). As another example, the input device can include a motion sensor (e.g., IMU 248) configured to detect motion of the input device. In some examples, a specific orientation of the input device and/or a pattern of movement of the input device can be indicative of a user picking up the input device and/or holding the input device in a pose ready for user input. In such examples, the one or more activation criteria can include a motion and/or orientation based activation criterion that is satisfied when the motion and/or orientation indicate a user picking up the input device or holding the input device in a pose for input, and not satisfied when the motion and/or orientation indicate otherwise.

Additionally or alternatively, in some examples, the activation criteria can relate to one or more sensors of a computing device different from the input device. For example, an image sensor of a computing device (e.g., outward facing camera(s) 214) can be used. In some examples, the activation criteria can include a criterion that the input device is within the field of view of the outward facing camera(s) 214. In some examples, the activation criteria can include a criterion that the input device is within a threshold distance of a writing surface (e.g., a wall, a table, a pad of paper, a floor). In some examples, the activation criteria can include a criterion that the input device is held within a hand based on detection of a pose of the hand holding the input device and/or based on a pattern of occlusion of the input device by a hand of the user.

At 410, input device can detect contact between the input device and a surface (e.g., a non-touch sensitive surface or a touch-sensitive surface). In some examples, contact between the input device and the surface can indicate an input from the input device (e.g., an initiation of writing or drawing input). In some examples, the contact can be based on one or more sensors of the input device. In some examples, the SMI sensors (e.g., optionally activated when the activation criteria are satisfied) can be used to track distance between the stylus tip 234 and the surface, and a contact can be detected when the distance to the surface is less than a threshold (e.g., zero or within a threshold of zero based on the distance between the SMI sensor and the stylus tip point). Additionally or alternatively, the contact can be detected based on force applied to the stylus tip 234 (e.g., using force sensor 246) or based on motion (e.g., using an accelerometer or IMU 248) that are indicative of contact between the input device and the surface.

At 415, the system can localize the input device to determine one or more spatial relationships between the input device and the computing device or between the input device and the surface within a three-dimensional space. As described herein, localizing the input device can enable the tracking and generation of content using relative movement detected by the SMI sensors of the input device. In some examples, a spatial relationship between the input device (e.g., stylus tip) and a non-touch-sensitive surface can be determined. In some examples, a variety of sensors and/or wireless communication circuitry can be used to determine the stylus position and/or motion with respect to the surface. For example, SMI sensors can be used to determine parameters including, but not limited to, angle (e.g., azimuth, radial, orientation/tilt), movement, and position in relation to the surface. In some examples, the input device can be localized using the sensors of the system. For example, the computing device (e.g., a head mounted display) can use outward facing camera(s) 214 to detect the input device with respect to the three-dimensional surface. In some examples, the computing device can generate information including, but not limited to, the position and/or movement of the outward facing camera with respect to a non-touch sensitive surface. In some examples, a head mounted display comprising an outward facing camera can capture information about the position and/or movement of the outward facing camera with respect to the input device. In some examples, the system can additionally or alternatively use one or more infrared sensors (e.g., using infrared sensor (and/or transmitter) 218, 254), magnetic sensors (e.g., magnetic sensor (and/or generator) 220, 256), radiofrequency sensors (radiofrequency sensor (and/or transmitter) 216, 252), etc. to localize the input device relative to the surface. In some examples, the input device can comprise one or more infrared (IR) or near IR wavelength light-emitting diodes and the computing system can include one or more cameras configured to detect 2D/3D position of IR or near IR light (e.g., to detect a pattern of IR or near IR light and/or a sequence of positions or patterns of IR or near IR light). In some examples, the input device can comprise active or passive magnetic components and/or RF components configured to operate in an ultra-low power mode or without a power supply and the computing system can include a magnetometer or RF receivers to triangulate three-dimensional position of the input device.

In some examples, the localization can match and lock the input device self-orientation (e.g., azimuth and radial angle) with the three-dimensional writing surface orientation, so that writing or drawing input from the input device can be displayed accurately along with the surface or a representation of the surface in a three-dimensional environment.

At 420, the parameters of the input device can be tracked and used to render content on the three-dimensional environment displayed by the display. For example, the head mounted display can be used in conjunction with the input device to display writing or drawings on a non-touch sensitive surface in the real-world environment. The rendering can be based on relative motion by the input device and based on the spatial relationships from the localization at 415. For example, as described above with respect to FIG. 3, one or more parameters associated with the input device can be detected and/or tracked. The one or more parameters can include position, orientation, and/or movement of the one or more input devices. In some examples, the one or more parameters can include a displacement of the stylus tip 234 tracked using the SMI sensors, including angle-corrected lateral velocity and displacement. In some examples, the computing device of the system (e.g., a head mounted display) can present the three-dimensional environment or a representation of the three-dimensional environment and render writing or drawing by the input device using the one or more parameters tracked at least partially using the SMI sensors in the three-dimensional environment. As described above with respect to FIG. 3, the tracking of the one or more parameters can include tracking additional complimentary, or redundant information from the SMI sensors or additional sensors (e.g., IMU of the input device, force of the force sensors, SMI distance from the surface, etc.) to augment the tracking of the input device motion, orientation and force to render the input device content.

At 425, input device can detect a break in contact between the input device and the surface (e.g., a non-touch sensitive surface or a touch-sensitive surface). In some examples, break in contact between the input device and the surface can indicate a temporary end of an input from the input device (e.g., an initiation of a break in writing or drawing input between strokes). These breaks can be used to avoid digital inking using the input device between strokes. In some examples, the break in contact can be based on one or more sensors of the input device. In some examples, the SMI sensors can be used to track distance between the stylus tip 234 and the surface, and a break in contact can be detected when the distance to the surface is greater than a threshold (e.g., zero or more than a threshold of zero based on the distance between the SMI sensor and the stylus tip point). Additionally or alternatively, the break in contact can be detected based on force applied to the stylus tip 234 (e.g., using force sensor 246) or based on motion (e.g., using an accelerometer or IMU 248) that are indicative of a break in contact between the input device and the surface.

At 430, the input device can be deactivated (sleep) in accordance with satisfying one or more deactivation criteria. In some examples, deactivating or sleeping the input device can cause the SMI sensors to be powered down (put in a low-power mode), causing the input device processor to be powered down (put in a low-power mode) and/or power down (put in a low-power mode) the communication circuitry. In some examples, deactivating or sleeping the input device can refer to configuring the SMI sensor scans to run at a different scan rate (e.g., less frequently) or at a different (e.g., lower) resolution of SMI scan, configuring the wireless communication circuitry to operate at a different power level or rate (e.g., decreasing the power and/or rate of communication), and/or configuring the processing circuitry to operate at a different power level or rate (e.g., decreasing the power and/or processing rate), among other possibilities. The one or more sleep criteria can include one or more of detecting a user is no longer holding the input device or no longer using the input device for input (e.g., force threshold is below a threshold, motion indicative of a user putting down the input device and/or holding the input device outside a pose ready for user input, a writing surface is not detected in the field of view of the outward facing camera(s) 214, the input device is outside a threshold distance of a writing surface, and/or a visual indication that the input device is not held within a hand).

Localization can be performed in a number of contexts, including, but not limited to, when the stylus enters a wake-up condition, when the stylus comes within a threshold distance of a non-touch sensitive writing surface, when the stylus begins and/or stops writing as described by step 425, when the stylus is placed on a surface, when the stylus is moved across a surface, intermittently while the stylus is at rest 430, etc.

It is understood that process 400 illustrated in FIG. 4 is not limited to the operation as presented, but can include, fewer, additional, and/or simultaneous operations according to various examples. For example, the input device may remain in an activation state at all times or be manually activated rather than activating or deactivating the input device at 405 and 430. Additionally or alternatively, the system can localize and re-localize the input device relative to the computing device and/or real-world surface multiple times before, during, and after contact, tracking parameters of the input device, or break in contact. In some examples, writing or drawing input from the input device can be used without rendering the content on the display at the localized region within the three-dimensional environment. For example, the tracking of the input device position can be used to identify specific relative motions indicative of corresponding inputs. For example, input writing letters can be used to render text input to an active text input user interface on the display without the writing being rendered as handwriting at the location of the input device within the three-dimensional space. As another example, movement corresponding to a check mark can be detected as a selection or confirmation input rather than as writing or drawing input localized to the surface within the three-dimensional environment.

Figure 5:
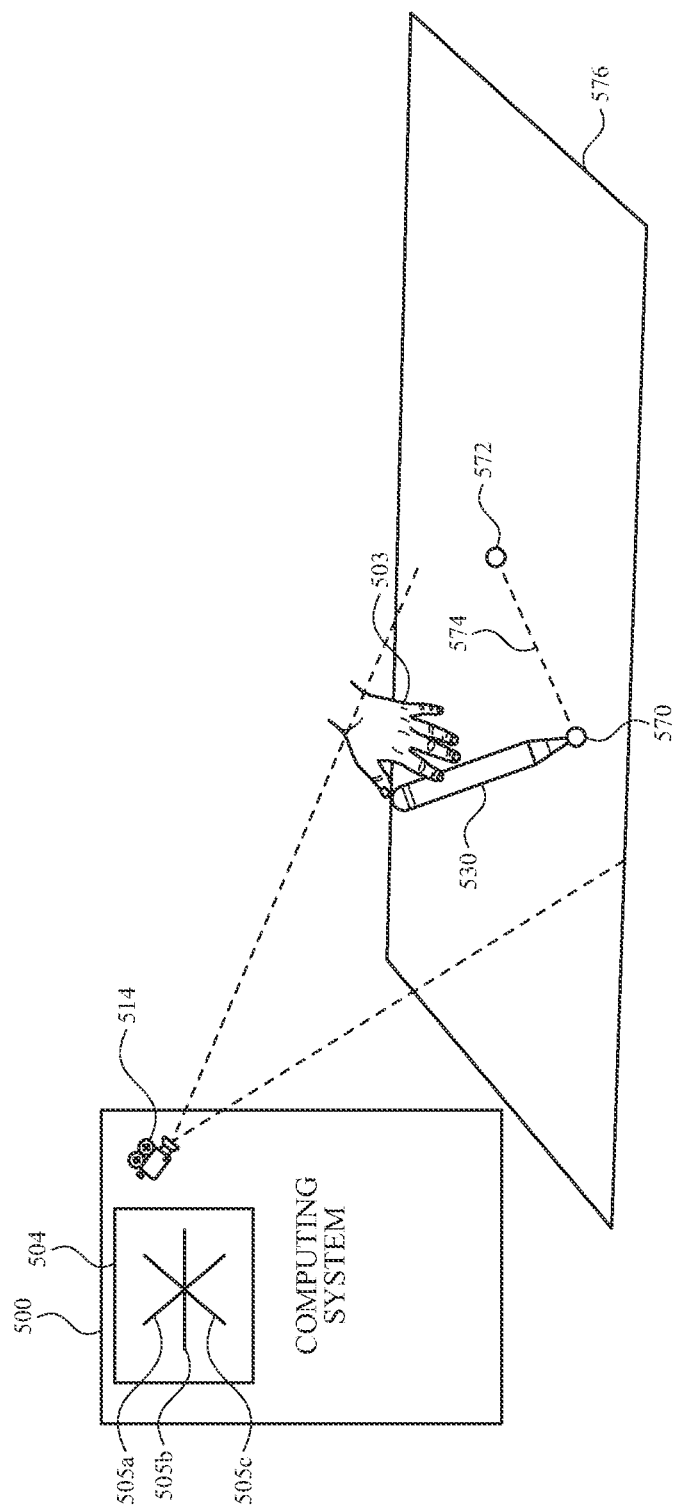
FIG. 5 illustrates a system comprising an input device and a computing system according to examples of the disclosure.

As described herein, computing system 200 can be implemented to localize and/or track stylus movement according to examples of the disclosure. FIG. 5 illustrates a system comprising an input device 530 (e.g., a stylus corresponding to input device 230) and a computing system 500 (e.g., corresponding to computing system 200). The computing system can comprise one or more outward facing cameras 514 (e.g., corresponding to outward facing camera(s) 214) that can capture input device 530 and a non-touch-sensitive surface 576 in its field of view. The input device 530 can comprise one or more SMI sensors and/or can include any appropriate combination of the one or more sensors described according to the examples of the disclosure. In some examples, input device 530 can make contact with non-touch-sensitive-surface 576 at point 570, draw a stroke 574 on non-touch-sensitive-surface 576 (e.g., a line) between points 570 and 572, and break contact with non-touch-sensitive-surface 576 at point 572. The input device 530 movement and/or position information can be collected by sensors within stylus 530 (e.g., relative displacement using SMI sensors). Stroke 574 can be rendered on writing surface 504 using the display (e.g., corresponding to display 204) of computing system 500 as a line between points 570 and 572, however the computing system 500 can render a corresponding straight line 505c on the display with the correct orientation and position with respect to writing surface 504 as the input stroke using input device 530 on the real-world writing surface 576. The correct position and/or orientation can be achieved using the spatial relationship between the input device 530 and the real-world writing surface 576 using localization. Without localization, the relative motion of stroke 504 could be used to generate other lines with different orientations and positions (or less accurate positions/orientations) with respect to the real-world environment as represented by line 505a or line 505b, each of which can correspond to the relative line motion rendered of stroke 574. Thus, the user experience can be improved by the system computing system 500 and/or input device 530 include a one or more sensor components to collect information about the absolute position of input device 530 and non-touch sensitive surface 576 and/or spatial relationships between the input device and the surface. In some examples, outward facing camera(s) 514 can collect information that identifies input device 530 and its absolute position/spatial relationship with respect to non-touch-sensitive surface 576.

Figure 6:
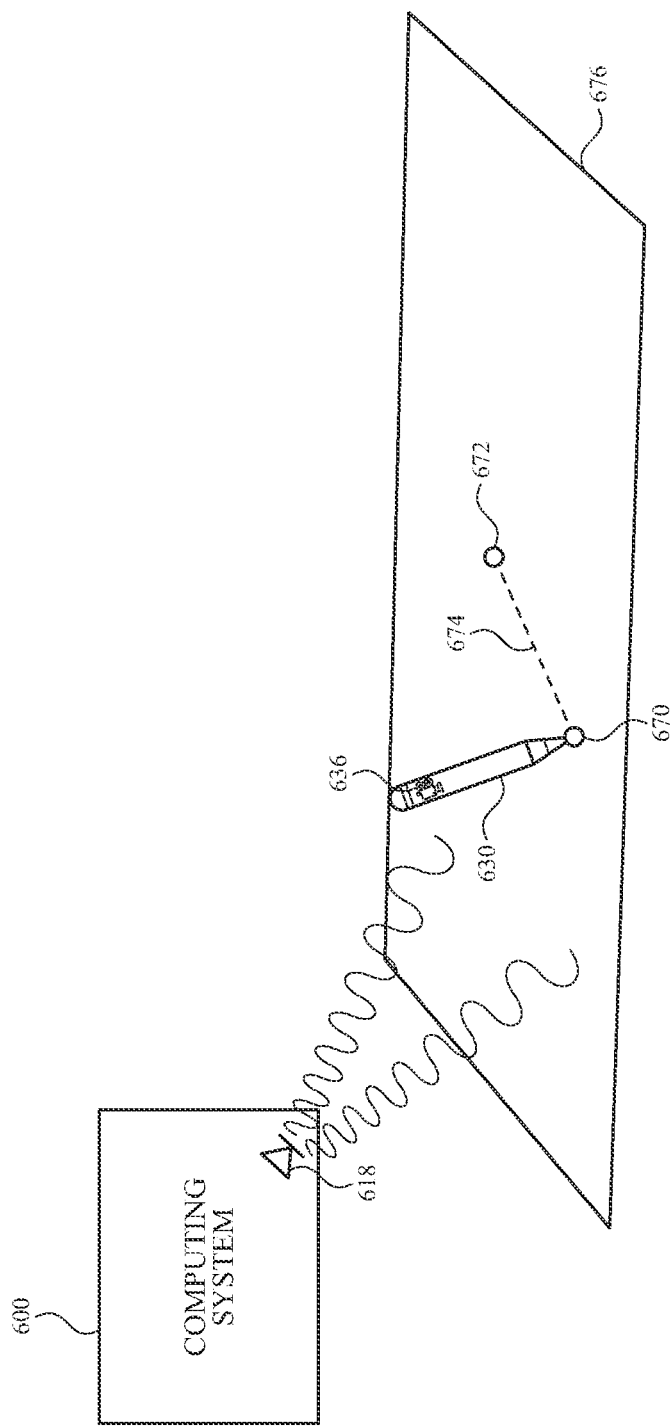
FIG. 6 illustrates an exemplary system comprising an input device and a computing system according to examples of the disclosure.

The localization described with respect to FIG. 5 relies on the camera of computing device 500, but in some examples, the localization can involve components of both the input device and the computing device. FIG. 6 illustrates an exemplary system comprising an input device 630 (e.g., corresponding to input device 230) and a computing system 600 (e.g., corresponding to computing system 200) according to examples of the disclosure. In some examples, the computing system can comprise one or more light emitting components 618 (e.g., one or more infrared transmitters 218) configured to emit light (e.g., infrared light), including towards a non-touch-sensitive surface 676. In some examples, the light emitting components 618 can be configured to emit structured light (e.g., light having a pattern array) onto the non-touch-sensitive surface that can be detected by a light detector such as outward facing camera 636. In some examples, the structured light can change the intensity, dimensions, or density of projected light beams that can be identified using camera sensors or other light detector(s) and used to provide information about the spatial relationship between the input device, surface, and computing system. In some examples, outward facing camera 636 can be disposed in or near the tip of the input device 630 (e.g., stylus tip 234) to image the surface in proximity or contact with the input device tip. Additionally, as described herein, input device 630 can comprise one or more SMI sensors among other sensors to detect and/or track input device 630 making contact with non-touch-sensitive-surface 676 at point 670, relative motion of a stroke 674 on non-touch-sensitive-surface 676 (e.g., a line) between points 670 and 672, and a break in contact with non-touch-sensitive-surface 676 at point 672. Stroke 674 can be rendered on the writing surface using the display of computing system 600 as a line between points 670 and 672, in a similar manner as describe with respect of FIG. 5, but using the absolute position/spatial relationship(s) between the input device 630, non-touch sensitive surface 676 and/or computing system 600 and the relative motion of input device 630 with respect to non-touch sensitive surface 676 to render the content. In some examples, light emitter and detector configuration can be reversed such that the input device can emit light and the computing system can detect light to determine a spatial relationship between the input device and the computing system.

As described herein, SMI sensors can be used to track distance to a surface and/or relative motion of the input device with respect to a surface. In some examples, the SMI sensors can be configured to emit two or more beams to a surface external to the input device as described with reference to FIGS. 7A-9B. In some examples, one or more SMI sensors can be configured to emit light toward a component at least partially internal to the input device as described with reference to FIGS. 10-12.

Figure 7A:
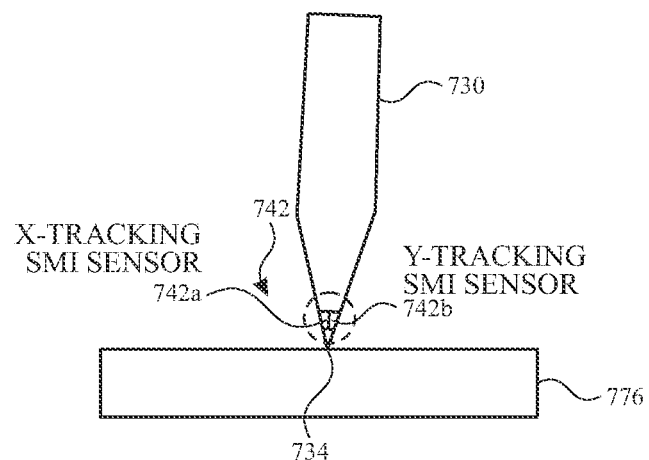
FIGS. 7A-7C illustrate an example input device configuration with two SMI sensors according to examples of the disclosure.
Figure 7B:
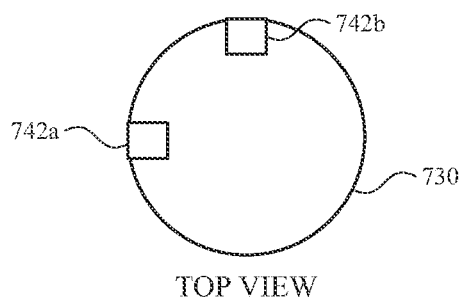
Figure 7C:
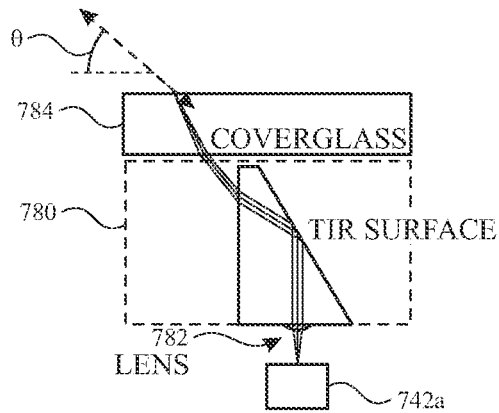
Figure 8A:
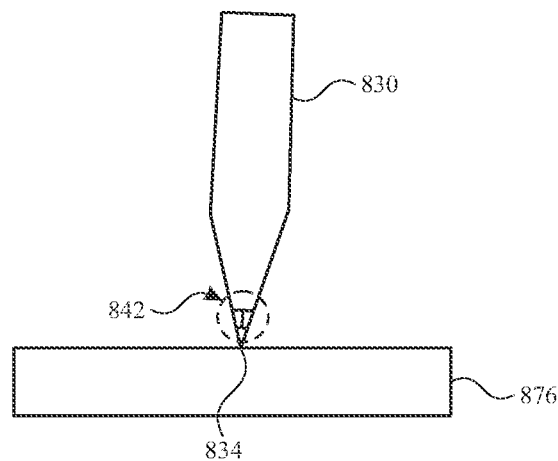
FIGS. 8A-8D illustrate an example input device configuration with three SMI sensors according to examples of the disclosure.
Figure 8B:
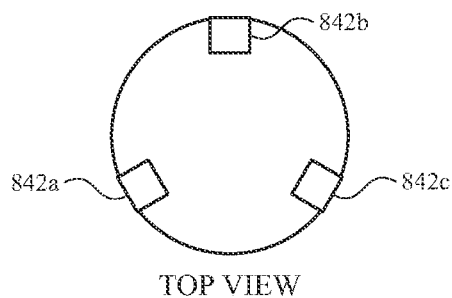
Figure 8C:
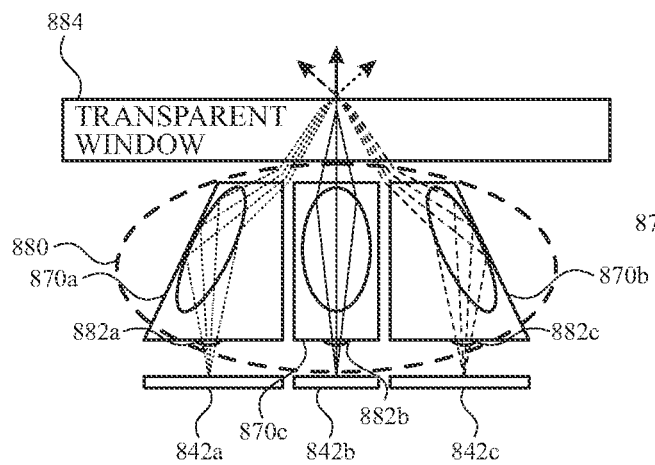
Figure 8D:
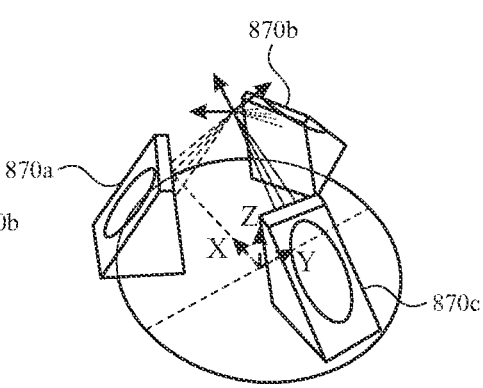

FIGS. 7A-7C illustrate an example input device configuration with two SMI sensors according to examples of the disclosure. Input device 730 can be a stylus including a tip 734 formed at least partially from a partially or completely optically transparent material (e.g., represented by cover glass 784), and SMI sensors 742 including a first SMI sensor 742a and a second SMI sensor 742b that can be configured to track displacement in two-dimensions (e.g., in an x-y plane). In some examples, SMI sensors 742 can be arranged and the materials of the tip 734 can be designed to provide an improved or optimal refraction angle for the beams of the SMI sensors. For example, as shown in the top view of a cross-section of the stylus tip in FIG. 7B, a first SMI sensor 742a and a second SMI sensor 742b can be arranged mutually orthogonal and orthogonal to a third dimension relative to the plane of surface 776. In some examples, optical components can be disposed between the tip 734 and SMI sensors 742 to properly orient beams of light emitted and/or received by the SMI sensors. For example, the optical components can comprise a lens 782 and one or more translucent or transparent materials 780 (e.g., a total internal reflection surface) configured to refract light in a desired (or optimal) refraction angle. Lens materials can comprise translucent or transparent material, including, but not limited to, a lens substrate, glass, optical polyester (e.g., OKP-1), organic materials, etc. The lens can be shaped to refract and/or reflect light as required to achieve a desired signal-to-noise ratio (SNR), system speed, and/or accuracy. For example, the lens can be shaped to focus and/or collimate the light. Although optical components are shown for one SMI sensor in FIG. 7C, it is understood that similar components could be used for each SMI sensor.

As described herein, SMI sensors can be configured to measure information including velocity, distance and displacement by transmitting and receiving light. The transmitted light can reflect off non-touch-sensitive surface 776, the reflected light can pass through the transparent tip and be detected by SMI sensors 742a and 742b. In some examples, the sensors can be driven with waveform configurations according to examples of the disclosure. For example, the sensors can be driven with a triangular current waveform. In other examples, the sensors can be driven with a sinusoidal input. When driven by a sinusoidal input, the received signals can be demodulated. For example, a in-phase/quadrature (I/Q) demodulation scheme can implemented.

FIGS. 8A-8D illustrate an example input device configuration with three SMI sensors according to examples of the disclosure. Input device 830 can be a stylus including a tip 834 formed at least partially from a partially or completely optically transparent material (e.g., represented by cover glass 884), and SMI sensors 842 including a first SMI sensor 842a, a second SMI sensor 842b, and a third SMI sensor 842c, that can be configured to track displacement in three-dimensions (e.g., x, y and z axes). In some examples, SMI sensors 842 can be arranged and the materials of the tip 834 can be designed to provide an improved or optimal refraction angle for the beams of the SMI sensors. For example, as shown in the top view of a cross-section of the stylus tip in FIG. 8B, a first SMI sensor 842a, a second SMI sensor 842b, and a third SMI sensor 842c can be arranged such that beams of light emitted from any pair of sensors upon exiting the tip 834 are mutually orthogonal (or within a threshold angle such that the beams are approximately orthogonal). In some examples, optical components 880 can be disposed between the tip 834 and SMI sensors 842 to properly orient the path of beams of light emitted and received by the SMI sensors. For example, as shown in the side profile and perspective views of FIGS. 8C and 8D, the optical components 880 can include one or more lenses 882a-882c and/or TIR surfaces 870a-870c similar to those described with reference to FIG. 7C and not repeated here for brevity.

Figure 9A:
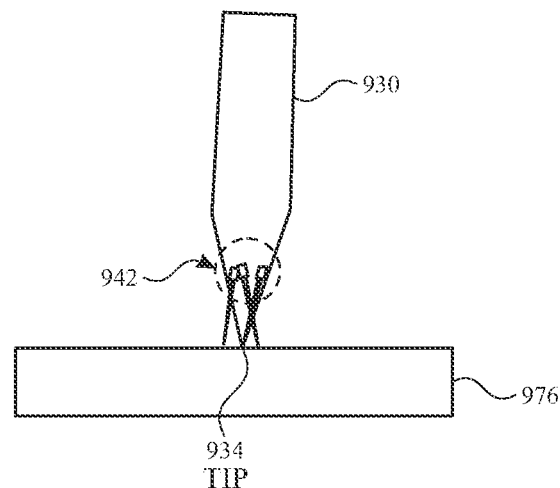
FIGS. 9A-9B illustrate an example input device configuration with three SMI sensors according to examples of the disclosure.
Figure 9B:
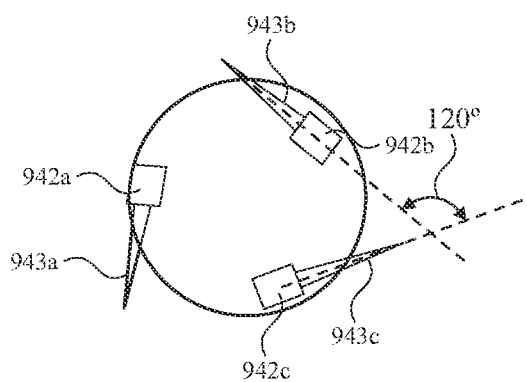

FIGS. 9A-9B illustrate an example input device configuration with three SMI sensors according to examples of the disclosure. Input device 930 can be a stylus including a tip 934 and three SMI sensors 942 arranged 120 degrees apart (or within a threshold angle of 120 degrees apart) along the circumference of the stylus and oriented such that beams of light emitted by each sensor are mutually orthogonal as shown by the beams 943a-c emitted by SMI sensors 942a-c. For example, as shown in the top view of a cross-section of the stylus tip in FIG. 9B and projected onto the plane of the surface, a first SMI sensor 942a, a second SMI sensor 942b, and a third SMI sensor 942c can be arranged such that beams of light emitted from any pair of sensors upon exiting the tip 934 have approximately 120 degrees of separation when projected into the plane of the surface. The stylus housing can include transparent or translucent windows configured to allow light from the SMI sensors to exit the stylus housing and return to the SMI sensors. Additionally, the SMI sensors 942 can be disposed at a different, greater distance from the point of the stylus tip as compared with input devices 730 and 830. The SMI sensors 942 can be configured to measure displacement based on light reflected off a surface including, but not limited to, micron-scale changes in three-dimensional position. Stylus movement with respect to the surface, therefore, can be captured with a high degree of resolution.

In some examples, SMI sensors 942a-c can measure distance (e.g., from non-touch sensitive surface 976) and velocity information for three-axes that can be used to determine stylus position, orientation and/or movement. For example, the input device can capture distance and velocity measurements for each of the three SMI sensor. Based on the relative position and motion, the processing circuitry of the input device and/or computing system can calculate displacement within a 3-dimensional space. In some examples, the processing can include calculating movement information including, but not limited to, stylus tilt with respect to the non-touch sensitive surface, yaw of stylus about an axis extending from a line along a first dimension of the stylus body, and orientation of the stylus with respect to a surface. In some examples, the system can contextualize information gathered before, during and/or after a stylus is moved to extrapolate stylus position and/or motion when SMI sensor data may be incomplete. For example, a stylus can be held in a transient position including, but not limited to, held orthogonal to the surface or held parallel to the surface such that one or more SMI beams may not be incident on the surface, or otherwise held at a distance outside of a focusing range of the SMI sensors. As a result, the SMI sensors may not receive a retroreflective signal from the surface, or may not receive a complete retroreflective signal (e.g., missing a lateral beam vector component corresponding to lateral velocity). To determine three-dimensional position and/or movement of the stylus, the system can extrapolate from information that precedes or follows the previously mentioned transient positions. Integrating movement and/or position data prior to the transient position can allow for an estimate the movement and/or position of the stylus during the transient state. For example, the velocity measured by one or three or more SMI sensors can be used to calculate information about stylus movement and/or position when the stylus is held orthogonal or parallel to a non-touch-sensitive surface.

In some examples, as described herein the arrangement of three or more SMI sensors can provide information that informs how the system renders strokes on a display. For example, stylus tilt can be determined and vary properties of strokes rendered on the display. Stylus tilt can be calculated using the input of three or more SMI sensors with respect to the non-touch-sensitive surface. For example, while writing, the stylus end opposite from the tip can be lowered towards the non-touch-sensitive surface. The system can be configured to emulate the experience of writing with a pen or pencil such that, when the stylus is lowered towards the non-touch-sensitive surface, a line width rendered on the display can increase. In further examples, while writing, the stylus end opposite from the tip can be raised away from the non-touch-sensitive surface, towards a position wherein the stylus is orthogonal to the surface. The system can be configured to narrow line width rendered on the display in response to detecting the stylus movement.

In some examples, to improve estimation of stylus yaw and more accurately process and render strokes, the computing system (e.g., computing system 200) can use information from one or more sensing devices 212 and from the stylus (e.g., input device 230/930) to store a multi-dimensional map of the non-touch sensitive surface 976. Prior to rendering strokes on the display, information from three or more SMI sensors can be used by the one more processors to correct any skew in the surface coordinate system that may result from stylus rotation in the hand of the user. Using the addition of information from SMI sensors to calculate stylus yaw can be used to reduce algorithmic complexity, thus reducing processing power and/or increasing processing speed, according to some examples of the disclosure.

In some examples, input device 930 can include an opaque tip that can provide for a broader range of tip materials, which may be better for user experience. For example, the material of the tip may be selected to provide a physical feedback of friction that may be similar to the friction between a writing surface and a tip of an ink or lead pen or pencil. The friction provided by the tip can prevent erroneous marks on the paper and provide more accurate input using a stylus. To emulate the sensation, tip 934 can be formed from materials that provide a similar writing experience while allowing SMI sensors to receive reflections from a non-touch-sensitive surface. For example, the tip can be formed from a plastic material that when moved across a non-touch sensitive surface can provide frictional drag, thus emulating the sensation of writing with a pen or pencil. Additionally, the tip material can be selected to avoid damaging surface, to improve durability and/or to resist wear of the stylus tip.

In some examples, the stylus can write on a curved (non-planar), non-touch-sensitive surface. For example, SMI sensors 942a-c can be arranged such that beams 943a-c transmitted from each SMI sensor can be incident on the non-touch sensitive surface 976 and provide displacement and velocity information from points sufficiently far apart to allow for detection of surface curvature. Beams can be directed, for example, between 0.5-2 mm apart as projected on the surface. In some examples, the beams can be separated by approximately one millimeter. The information from the SMI sensors can be processed by the processing circuitry of the computing system and/or input device to understand the planarity of the surface, using the calculated surface planarity to render lines corresponding to stylus strokes on the surfaces in the three-dimensional environment while reducing or eliminating influence from curvature of the non-touch sensitive surface.

As described herein, in some examples, the SMI sensors can be configured to measure displacement of internal components of an input devices, such as by tracking displacement of a rod or trackball at least partially disposed in the housing of the input device.

Figure 10:
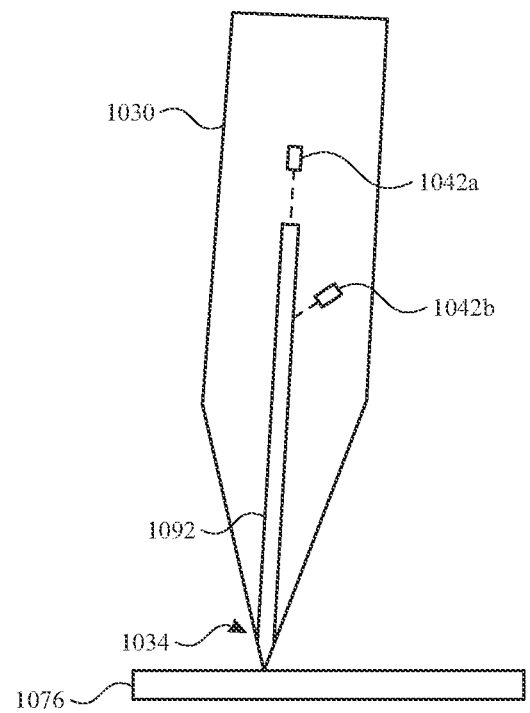
FIG. 10 illustrates an example stylus input device configuration with a plurality of SMI sensors and a rod formed from compliant materials according to examples of the disclosure.

FIG. 10 illustrates an example stylus input device configuration with a plurality of SMI sensors and a rod formed from compliant materials according to examples of the disclosure. As illustrated in FIG. 10, the compliant rod 1092 can be disposed at partially within the housing of stylus 1030. In some examples, the compliant rod 1092 can be partially integrated with the stylus tip 1034. When writing on surface 1076, force applied to the stylus tip 1034 can couple to compliant rod 1092, causing displacement of the rod within the stylus housing (e.g., within the cavity of the housing). In some examples, one or more SMI sensors can be configured to track movement of compliant rod 1092. For example, one or more SMI sensors 1042a can be arranged to emit light towards the end of the compliant rod to measure axial displacement. A sensor positioned to track movement of the end of the compliant rod can provide information about strokes generated by the stylus while in contact with the non-touch-sensitive surface according to examples of the disclosure. For example, contact and applied force vectors between the surface and the stylus can move the compliant rod towards SMI sensor 1042*a*. Displacement and velocity of the compliant rod with respect to SMI sensor(s) 1042*a* can then be used to understand the force applied to the stylus. Information about force vectors applied to the stylus tip can be used to vary properties of content generated on a display including, but not limited to, traces and directions of stroke vectors from surface lateral movement tracking, stroke line width and its changes from surface-normal force detection, stroke textures from surface friction/roughness detection. Additionally or alternatively, in some examples, one or more additional SMI sensors 1042*b* can be arranged circumferentially around the rod, optionally at a non-orthogonal angle with respect to the axis of the rod. For example, a number of SMI sensors 1042*b* can be used in conjunction to capture deflections of the compliant rod 1092 in two or three dimensions and these deflections of the compliant rod can be used to detect the relative motion and/or position of the stylus. Because the SMI sensor beams target the compliant rod internal to the stylus, such an implementation removes a requirement for transparent or translucent materials for the housing. In some examples, the rod can be formed at least partially of rigid materials, including, but not limited to, plastics that can reflect light from the SMI sensors. Rod materials can provide writing detection on surfaces independent of optical properties of the writing surfaces with which the stylus is used. In some examples, as the portion of rod 1092 that contacts surface 1076 vibrates in response to surface roughness, the stylus can include one or more sensors configured to capture vibration. For example, one or more IMU and/or force sensors can be used to collect information about vibration. System 200 can then process information about vibration to account for surface roughness, varying properties of rendered lines on a display. It is understood that although SMI sensors provide benefits such as high resolution positioning, tracking of stylus tilt, and translation of the rod, alternative sensing modalities can be implemented. Additionally or alternatively, sensing types including, but not limited to, capacitive and piezoelectric sensors. In some examples, pencil rotation can be detected through integration with one or more components including, but not limited to, an external camera, magnetic sensing, calibrated IMUs, or an ergonomic depression formed on the housing to enforce a rotation angle when the stylus is held. In some examples, pencil rotation can be corrected. For example, the system can guide a user through a calibration process wherein the stylus is held or moved in specific positions and/or orientations.

Figure 11A:
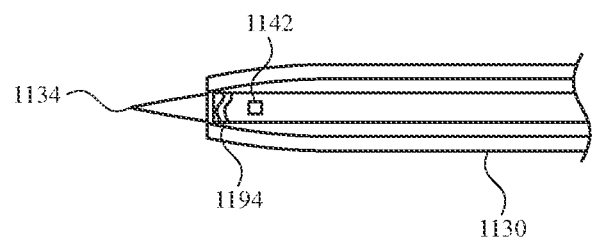
FIGS. 11A-11B illustrate an example stylus input device configuration with an SMI sensor and a rigid rod according to examples of the disclosure.
Figure 11B:
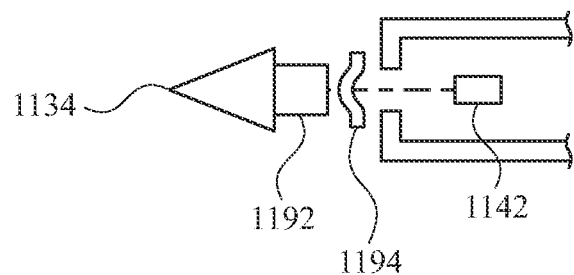

FIGS. 11A-11B illustrate an example stylus input device configuration with an SMI sensor and a rigid rod according to examples of the disclosure. Stylus 1130 can comprise a tip 1134 coupled to rigid rod 1192, with the rod enclosed within the stylus housing. In some examples, the compliance of the tip can be provided by a wave spring 1194 between the housing and a guide tube for the stylus tip. In some examples, a single SMI sensor 1142 can configured to emit a beam toward the rod and capture the axial displacement of the compliant tip 1134 and rod 1192. As force is applied to the tip by pressing against a surface 1176, the rigid rod moves in response due to compression of the wave spring 1194. The change in axial displacement can be processed to detect force and used by the system (e.g., by computing device 200 and/or input device 230).

Figure 12A:
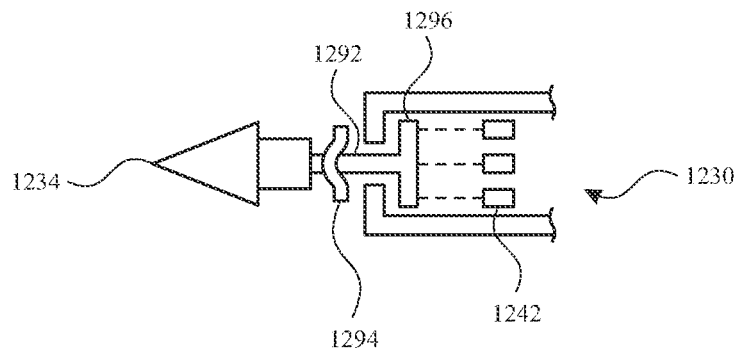
FIGS. 12A-12B illustrate an example stylus input device configuration with multiple SMI sensors and a rigid rod according to examples of the disclosure.
Figure 12B:
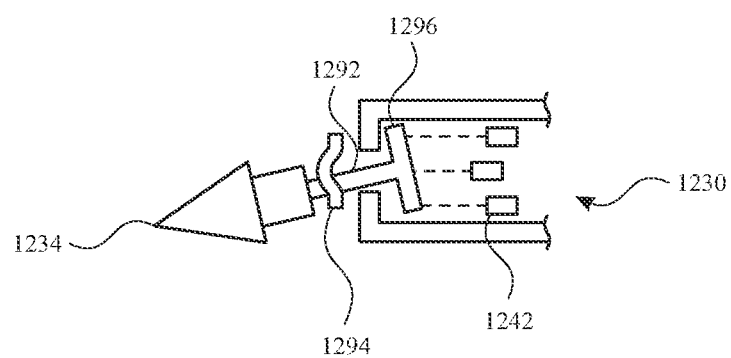

In some examples, the stylus can include multiple (e.g., three or more SMI sensors 1242) configured to monitor displacement of a target in multiple dimensions rather than simply axial force. FIGS. 12A-12B illustrate an example stylus input device configuration with multiple SMI sensors and a rigid rod according to examples of the disclosure. Stylus 1230 can include a tip 1234, a rod 1292 and a wave spring 1294 like stylus 1130. However, unlike in stylus 1130 rod 1292 can include a cap or head 1296 such that the cross-sectional area of the cap is greater than the circumference of a cross-section of the rod. Together the rod 1292 and head 1296 can provide a T-shaped target when viewed from an axial cross-section. Additionally, stylus 1230 can include multiple SMI sensors aimed toward head 1296. As force is applied to tip 1234, the tip 1234 and the target including the rod 1292 and head 1296 can be displaced (using the compliance of wave spring 1294 or other suitable component to provide compliance) as shown in FIG. 12B. The displacement of the tip can be measured by the multiple SMI beams from SMI sensors 1242 that are incident on the head 1296. For example, as the tip 1234 moves, the beams emitted by the three or more SMI sensors 1242 can reflect off the head 1296 and return to the SMI sensors. In some examples, the SMI sensors 1242 can include at least three sensors and can measure axial displacement as well as circumferential displacement. In some examples, the SMI sensors can provide additional information about stylus movement and/or position. For example, the combination of measurements from three or more SMI sensors can be used to resolve a vector of force applied to tip 1234. Combining information from the three or more SMI sensors can provide a differential displacement. Information about the force applied to the stylus can be used, for example, to vary properties of lines rendered on a display including, but not limited to, line width. Additionally or alternatively, force information can be used as a threshold to enable user interaction, such as selecting an icon and/or modifying gestures interpreted by the system.

Figure 13:
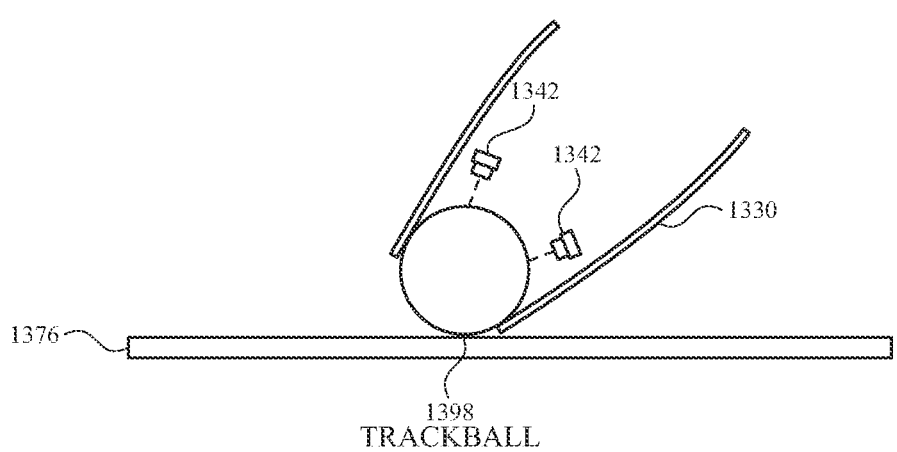
FIG. 13 illustrates an example stylus input device configuration comprising multiple SMI sensors and a trackball according to examples of the disclosure.

FIG. 13 illustrates an example stylus input device configuration comprising multiple SMI sensors and a trackball according to examples of the disclosure. In some examples, the stylus 1330 can include a trackball 1398 according to examples of the disclosure. In some examples, the stylus 1330 can including SMI sensors 1342 configured to track the trackball as the stylus is moved across a non-touch-sensitive surface 1376. In some examples, the SMI sensors 1342 can include at least two SMI sensors to track two-dimensional movement. In some examples, the SMI sensors 1342 can include at least three SMI sensors to track three-dimensional movement. The SMI sensors can be configured to track the orthogonal displacement of trackball, thus giving an indication of the displacement of the stylus that can be used for tracking relative displacement of the input device.

An SMI sensor is defined herein as a sensor configured to generate electromagnetic radiation (e.g., light), emit the electromagnetic radiation from a resonant cavity (e.g., a resonant optical cavity), receive a reflection or backscatter of the electromagnetic radiation (e.g., electromagnetic radiation reflected or backscattered from a surface, or an object having a surface (collectively referred to herein as a surface) back into the resonant cavity, coherently or partially coherently self-mix the generated and reflected/backscattered electromagnetic radiation within the resonant cavity, and produce an output indicative of the self-mixing (i.e., an SMI signal). The generated, emitted, and received electromagnetic radiation can be coherent or partially coherent. In some examples, the electromagnetic radiation emitted by an SMI sensor can be generated by an electromagnetic radiation source such as a vertical-cavity surface-emitting laser (VCSEL), a vertical external-cavity surface-emitting laser (VECSEL), an edge-emitting laser (EEL), a horizontal cavity surface emitting laser (HCSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge emitting LED), and so on. The generated, emitted, and received electromagnetic radiation can include, for example, visible or invisible light (e.g., green light, infrared (IR) light, ultraviolet (UV) light, and so on). The output of an SMI sensor (i.e., the SMI signal) may include a photocurrent produced by a photodetector (e.g., a photodiode), which photodetector is integrated with, or positioned under, above, or next to, the sensor's electromagnetic radiation source. Alternatively or additionally, the output of an SMI sensor may include a measurement of the current or junction voltage of the SMI sensor's electromagnetic radiation source. In some examples, the output of the SMI sensors can be converted to a distance or velocity measurement using processing circuitry described herein. A system using an input device with SMI sensors, such as one of the systems described with reference to FIGS. 1-13, may in some cases be used to provide input to an augmented, virtual or mixed reality application.

Figure 14D:
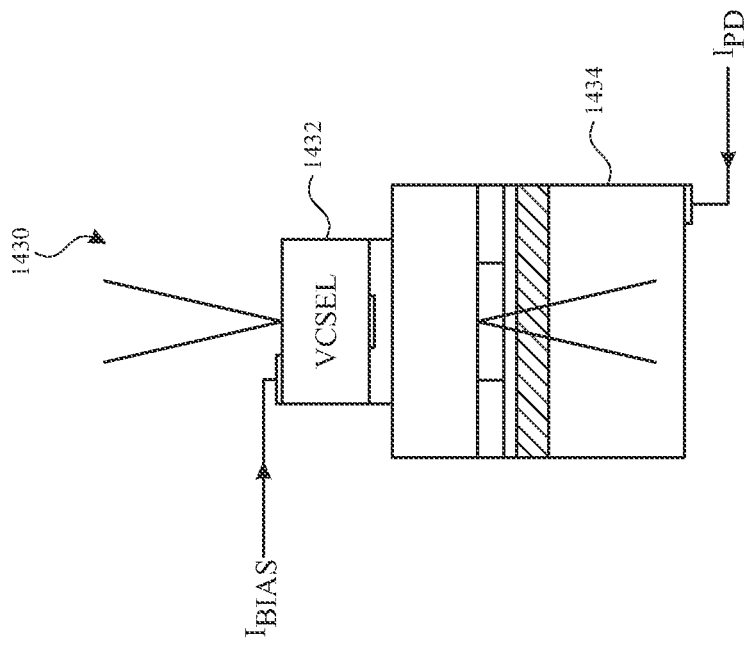
Figure 14C:
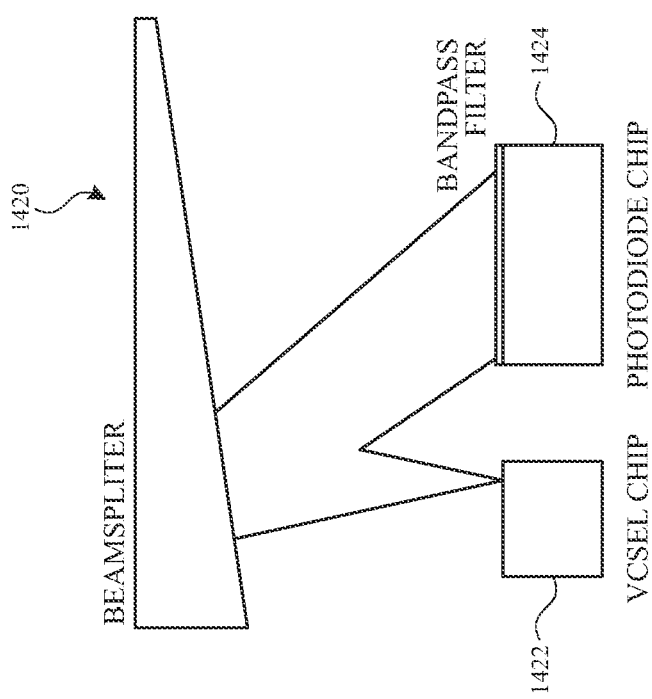

FIGS. 14A-14D illustrate example SMI sensors according to examples of the disclosure. FIG. 14A shows a first example SMI sensor 1400 that can include a VCSEL 402 with an integrated resonant cavity (or intra-cavity) photodetector (RCPD) 1404. FIG. 14B shows a second example SMI sensor 1410 that can include a VCSEL 1412 with an extrinsic on-chip RCPD 1414. In some examples, the RCPD 1414 may form a disc around the VCSEL 1412. FIG. 14C shows a third example SMI sensor 1420 that can include a VCSEL 1422 with an extrinsic off-chip photodetector 1424. FIG. 14D shows a fourth example SMI sensor 1430 that can include a dual-emitting VCSEL 1432 with an extrinsic off-chip photodetector 1434. In some examples, the top emission may be emitted towards optics and/or another target and the bottom emission may be provided to the extrinsic off-chip photodetector 1434.

Figure 15A:
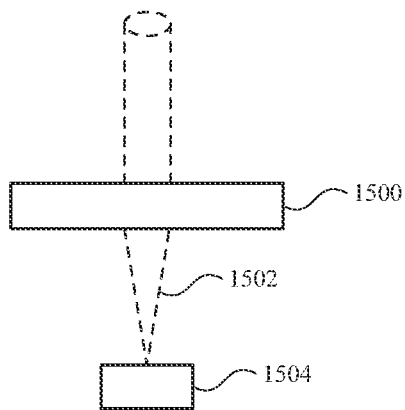
FIGS. 15A-15D illustrate example different beam-shaping or beam-steering optics that can be used with the SMI sensors according to examples of the disclosure.
Figure 15B:
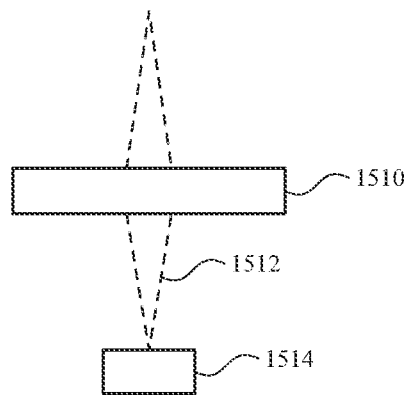
Figure 15C:
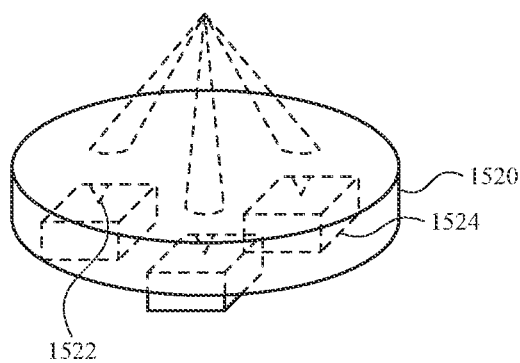
Figure 15D:
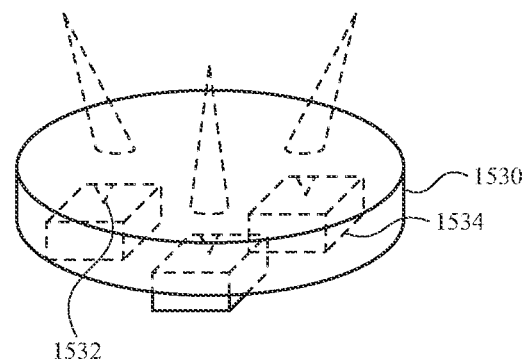

FIGS. 15A-15D illustrate example different beam-shaping or beam-steering optics that can be used with the SMI sensors according to examples of the disclosure. FIG. 15A shows beam-shaping optics 1500 (e.g., a lens or collimator) that can collimate the beam of electromagnetic radiation 1502 emitted by an SMI sensor 1504. A collimated beam can be useful when the range supported by a device is relatively greater (e.g., when a device has a range of approximately ten centimeters). FIG. 15B shows beam-shaping optics 1510 (e.g., a lens) that can focus the beam of electromagnetic radiation 1512 emitted by an SMI sensor 1514. Focusing beams of electromagnetic radiation may be useful when the range supported by a device is limited (for example, to a few centimeters or less). FIG. 15C shows beam-steering optics 1520 (e.g., a lens or set of lenses) that can direct the beams of electromagnetic radiation 1522 emitted by a plurality of SMI sensors 1524 such that the beams 1522 converge. Alternatively, the SMI sensors 1524 can be configured or oriented such that their beams converge without the optics 1520. In some examples, the beam-steering optics 1520 can include or be associated with beam-shaping optics, such as the beam-shaping optics described with reference to FIG. 15A or 15B. FIG. 15D shows beam-steering optics 1530 (e.g., a lens or set of lenses) that directs the beams of electromagnetic radiation 1532 emitted by a plurality of SMI sensors 1534 such that the beams 1532 diverge. Alternatively, the SMI sensors 1534 can be configured or oriented such that their beams diverge without the optics 1530. In some examples, the beam-steering optics 1530 can include or be associated with beam-shaping optics, such as the beam-shaping optics described with reference to FIG. 15A or 15B.

Figure 16:
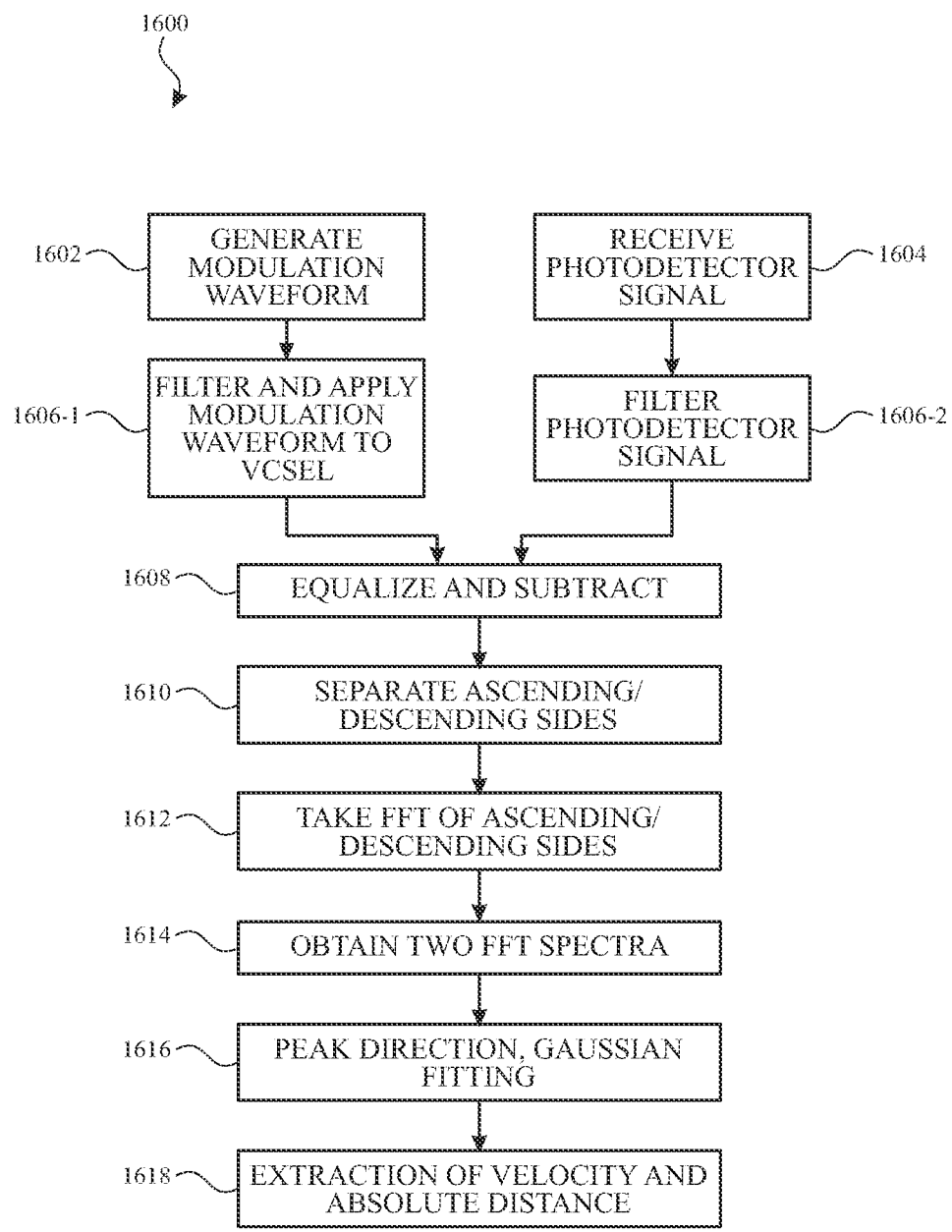
FIG. 16 illustrates a triangular bias process for determining velocity and distance of a surface using self-mixing interferometry according to examples of the disclosure.
Figure 17:
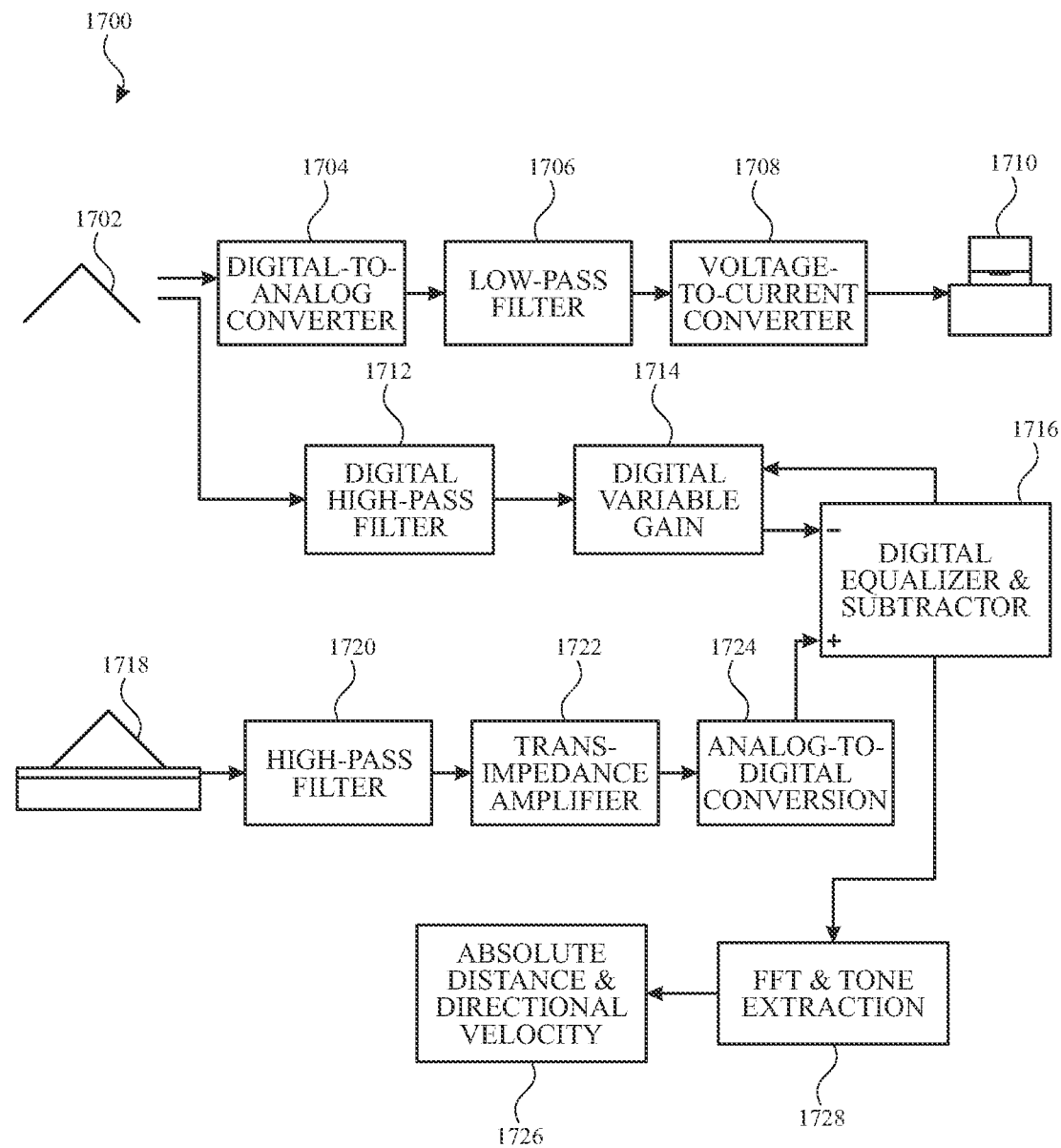
FIG. 17 illustrates a block diagram of a system that can implement the spectrum analysis for self-mixing interferometry signals according to examples of the disclosure.

FIG. 16 illustrates a triangular bias process 1600 for determining velocity and distance of a surface using self-mixing interferometry. Process 1600 can be used by one or more of the systems or devices described with reference to FIGS. 1-13 to modulate an SMI sensor using a triangular waveform. At 1602, an initial signal can be generated, such as by a digital or analog signal generator. At 1606-1, the generated initial signal can processed to produce the triangle waveform modulation current 1702 that can be applied to a VCSEL as shown in FIG. 17. In some examples, producing the triangle waveform can refer to operations of a digital-to-analog converter (DAC) when the initial signal is an output of a digital step generator), low-pass filtering (such as to remove quantization noise from the DAC), and voltage-to-current conversion. The application of the modulation current 1702 to the VCSEL can induce an SMI output 1718 (i.e., a change in an interferometric property of the VCSEL). It will be assumed for simplicity of discussion that the SMI output 1718 is from a photodetector, but in other examples it may be from another sensor.

At 1604, the SMI output 1718 can be received and at 1606-2, the SMI output 1718 can be initially processed, as needed. The initial processing can include high-pass filtering or digital subtraction. At 1608, a processor can equalize the received signals in order to match their peak-to-peak values, mean values, root-mean-square values, or any other characteristic values, if necessary. For example, the SMI output 1718 can be a predominant triangle waveform component being matched to the modulation current 1702, with a smaller and higher frequency component due to changes in the interferometric property. High-pass filtering can be applied to the SMI output 1718 to obtain the component signal related to the interferometric property. In some examples, at 1608, the processor can further separate and/or subtract the parts of the SMI output 1718 and the modulation current 1702 corresponding to the ascending and to the descending time intervals of the modulation current 1702. In some examples, at 1608, the processor can further sample the separated information.

At 1610 and 1612, a separate fast Fourier transform (FFT) can be first performed on the parts of the processed SMI output 1718 corresponding to the ascending and to the descending time intervals. The two FFT spectra may be analyzed at 1614. At stage 1616, the FFT spectra can be further processed, such as to remove artifacts and reduce noise. Such further processing can include peak detection and Gaussian fitting around the detected peak for increased frequency precision. From the processed FFT spectra data, information regarding the absolute distance can be obtained at 1618.

FIG. 17 illustrates a block diagram of a system (e.g., part or all of the processing system described with reference to FIGS. 1-13) that can implement the spectrum analysis described in the process described above with respect to FIG. 16. In the exemplary system shown, the system includes generating an initial digital signal and processing it as needed to produce a modulation current 1702 as an input to the VCSEL 1710. In an illustrative example, an initial step signal can be produced by a digital generator to approximate a triangle function. The digital output values of the digital generator can be used in the DAC 1704. The resulting voltage signal can then be filtered by the low-pass filter 1706 to remove quantization noise. Alternatively, an analog signal generator based on an integrator can be used to generate an equivalent voltage signal directly. The filtered voltage can be an input to a voltage-to-current converter 1708 to produce the desired modulation current 1702 in a form for input to the VCSEL 1710.

As described above, movement of a target can cause changes in an interferometric parameter, such as a parameter of the VCSEL 1710 or of a photodetector operating in the system. The changes can be measured to produce an SMI output 1718. In the example shown, it will be assumed the SMI output 1718 is measured by a photodetector. For the modulation current 1702 having the triangle waveform, the SMI output 1718 can be a triangle wave of a similar period combined with a smaller and higher frequency signal related to the interferometric property. In some examples, the SMI output 1718 may not be perfectly linear, even though the modulation current 1702 may be linear. This can be a result of the bias current verses light output curve of the VCSEL 1710 being non-linear (e.g., due to non-idealities, such as self-heating effects).

The SMI output 1718 can be first passed into the high-pass filter 1720, which can effectively convert the major ascending and descending ramp components of the SMI output 1718 to DC offsets. As the SMI output 1718 can be a current, the transimpedance amplifier 1722 can produce a corresponding voltage output (with or without amplification) for further processing. The voltage output can then be sampled and quantized by the ADC block 1724. Before immediately applying a digital FFT to the output of the ADC block 1724, it can be helpful to apply equalization. The initial digital signal values from the digital generator used to produce the modulation current 1702 can be used as input to the digital high-pass filter 1712 to produce a digital signal to correlate with the output of the ADC block 1724. An adjustable gain can be applied by the digital variable gain block 1714 to the output of the digital high-pass filter 1712.

The output of the digital variable gain block 1714 can be used as one input to the digital equalizer and subtractor block 1716. The other input to the digital equalizer and subtractor block 1716 can be the output of the ADC block 1724. The two signals can be differenced, and used as part of a feedback to adjust the gain provided by the digital variable gain block 1714. Equalization and subtraction can be used to clean up any remaining artifacts from the triangle waveform that may be present in the SMI output 1718. For example, a slope error or nonlinearity in the SMI output 1718 can result in artifacts from the triangle waveform after digital high-pass filter 1712. In such a situation, these artifacts may show up as low frequency components after the FFT and make the peak detection more challenging for nearby objects. Applying equalization and subtraction can partially or fully remove these artifacts.

After obtaining an improved or optimal correlation by the feedback, an FFT, indicated by block 1728, can then be applied to the components of the output of the ADC block 1724 corresponding to the rising and descending side of the triangle wave. From the FFT spectra obtained, absolute distance and/or directional velocity may be inferred using the detected peak frequencies on the rising and descending sides, as discussed above and indicated by block 1726.

Although the above description of the process involves applying a spectrum analysis to an SMI output, it is understood that this is an example, and that in other implementations, alternate methods for determining absolute distances may be obtained directly from a time domain SMI output, without applying a spectrum analysis. Various configurations are possible and contemplated without departing from the scope of the present disclosure.

Figure 18:
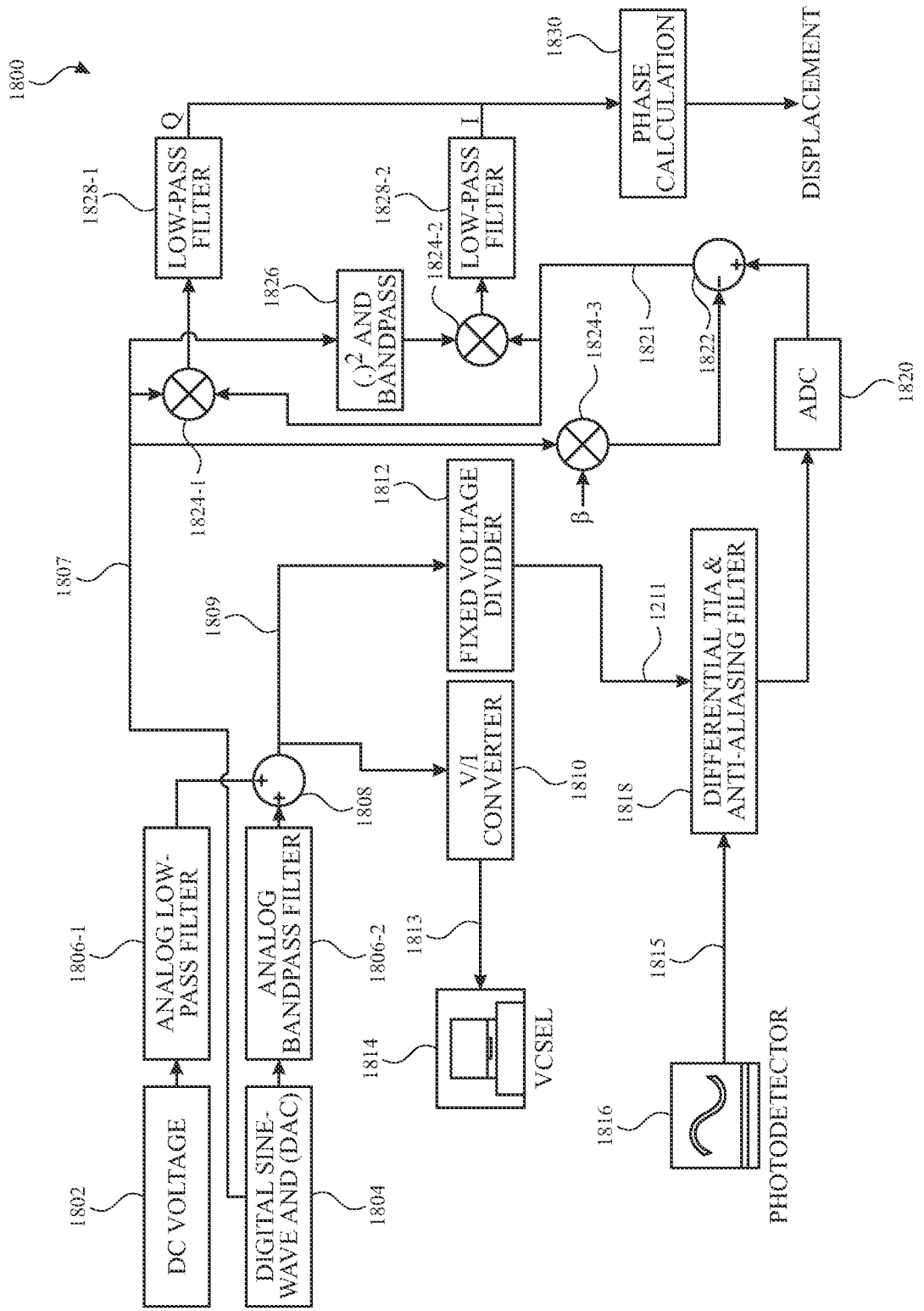
FIG. 18 illustrates a sinusoidal bias process for determining displacement of a surface using quadrature demodulation with self-mixing interferometry according to examples of the disclosure.

FIG. 18 illustrates a sinusoidal bias process 1800 for determining displacement of a surface using quadrature demodulation with self-mixing interferometry. Process 1800 can be used by one or more of the systems or devices described with reference to FIGS. 1-13, to modulate an SMI sensor using a sinusoidal waveform.

As explained in more detail below, FIG. 18 shows components which generate and apply a sinusoidally modulated bias current to a VCSEL. The sinusoidal bias current can generate in a photodetector 1816 an output current depending on the frequency of the sinusoidal bias and the displacement to the structural component of the device. In the circuit of FIG. 18, the photodetector's 1816 output current can be digitally sampled and then multiplied with a first sinusoid at the frequency of the original sinusoidal modulation of the bias current, and a second sinusoid at double that original frequency. The two separate multiplied outputs can each be low-pass filtered and the phase of the interferometric parameter can be calculated. Thereafter the displacement can be determined using at least the phase.

The DC voltage generator 1802 can be used to generate a constant bias voltage. A sine wave generator 1804 can produce an approximately single frequency sinusoid signal, to be combined with constant voltage. As shown in FIG. 18, the sine wave generator 1804 can be a digital generator, though in other implementations it can produce an analog sine wave. The low-pass filter 1806-1 can provide filtering of the output of the DC voltage generator 1802 to reduce undesired varying of the constant bias voltage. The bandpass filter 1806-2 can be used to reduce distortion and noise in the output of the sine wave generator 1804 to reduce noise, quantization or other distortions, or frequency components of its signal away from its intended modulation frequency, $\omega_m$.

The adder circuit 1808 can combine the low-pass filtered constant bias voltage and the bandpass filtered sine wave to produce on link 1809 a combined voltage signal which, in the example of FIG. 18, can have the form $V_0 + V_m \sin(\omega_{mt})$. This voltage signal can be used as an input to the voltage-to-current converter 1810 to produce a current to drive the lasing action of the VCSEL 1814. The current from the voltage-to-current converter 1810 on the line 1813 can have the form $I_0 + I_m \sin(\omega_{mt})$.

The VCSEL 1814 can thus be driven to emit a laser light modulated as described above. Reflections of the modulated laser light can then be received back within the lasing cavity of VCSEL 1814 and cause self-mixing interference. The resulting emitted optical power of the VCSEL 1814 can be modified due to self-mixing interference, and this modification can be detected by the photodetector 1816. As described above, in such cases the photocurrent output of the photodetector 1816 on the link 1815 can have the form: $i_{PD} = i_0 + i_m \sin(\omega_{mt}) + \gamma \cos(\psi_0 + \psi_m \sin(\omega_{mt}))$. The I/Q components to be used in subsequent processing can be based on the third term, and as a result, the first two terms can be removed or reduced by the differential transimpedance amplifier and anti-aliasing (DTIA/AA) filter 1818. To do such a removal/reduction, a proportional or scaled value of the first two terms can be produced by the voltage divider 1812. The voltage divider 1812 can use as input the combined voltage signal on the link 1809 produced by the adder circuit 1808. The output of the voltage divider 1812 on link 1811 can then have the form: $\alpha(V_0 + V_m \sin(\omega_{mt}))$. The photodetector current and this output of the voltage divider 1812 can be the inputs to the DTIA/AA filter 1818. The output of the DTIA/AA filter 1818 can then be, at least mostly, proportional to the third term of the photodetector current.

The output of the DTIA/AA filter 1818 can then be quantized for subsequent calculation by the ADC block 1820. Further, the output of the ADC block 1820 can have a residual signal component proportional to the sine wave originally generated by the sine wave generator 1804. To filter this residual signal component, the originally generated sine wave can be scaled (such as by the indicated factor of β) at multiplier block 1824-3, and then subtracted from the output of ADC block 1820 at subtraction block 1822. The filtered output on link 1821 can have the form: A+B sin($\omega_{mt}$)+C cos($2\omega_{mt}$)+D sin($3\omega_{mt}$)+ . . . , from the Fourier expansion of the $\gamma \cos(\psi_0 + \psi_m \sin(\omega_{mt}))$ term discussed above. The filtered output can then be used for extraction of the I/Q components by mixing.

The digital sine wave originally generated by sine wave generator 1804 onto link 1807 can be mixed (multiplied) by the multiplier block 1824-1 with the filtered output on link 1821. This product can then be low-pass filtered at block 1828-1 to obtain the Q component discussed above, possibly after scaling with a number that can be related to the amount of frequency modulation of the laser light and distance to the target. Additionally, the originally generated digital sine wave can be used as input to the squaring/filtering block 1826 to produce a digital cosine wave at a frequency double that of the originally produced digital sine wave. The digital cosine wave can then be mixed (multiplied) at the multiplier block 1824-2 with the filtered output of the ADC block 1820 on link 1821. This product can then be low-pass filtered at block 1828-2 to obtain the I component discussed above, possibly after scaling with a number that can be related to the amount of frequency modulation of the laser light and distance to the target. The I and the Q components can then be used by the phase calculation component 1830 to obtain the phase from which the displacement of the target can be calculated.

It is understood that although the example shown in FIG. 18 uses the digital form of the originally generated sine wave produced by sine wave generator 1804 on link 1807, that in other examples the originally generated sine wave may be an analog signal and mixed with an analog output of the DTIA/AA filter 1818. In other examples, the voltage divider 1812 can be a variable voltage divider. In other examples, the voltage divider 1812 can be omitted and the DTIA/AA filter 1818 can be a single-ended DTIA/AA filter. In such examples, subtraction may be performed digitally at subtraction block 1822. In other examples, the subtraction block 1822 can be omitted and no subtraction of the modulation current may be performed.

The circuit of FIG. 18 can be adapted to implement the modified I/Q process described above that uses $Q' \propto \text{Lowpass}\{I_{PD} \sin(3\omega_{mt})\}$. Some such circuit adaptations can include directly generating both mixing signals sin(2 $\omega_{mt}$) and sin(3 $\omega_{mt}$), and multiplying each with the output of the output of the ADC block 1220, and then applying respective low-pass filtering, such as by the blocks 1828-1, 1828-2. The DTIA/AA filter 1818 can then be replaced by a filter to remove or greatly reduce the entire component of $I_{PD}$ at the original modulation frequency $\omega_m$. One skilled in the art will recognize other circuit adaptations for implementing this modified I/Q process. For example, the signal sin(3 $\omega_{mt}$) can be generated by multiplying link 1807 and the output of squaring/filtering block 1826, and subsequently performing bandpass filtering to reject frequency components other than sin(3 $\omega_{mt}$).

Additional or alternatively, in some examples, the I/Q time domain based processes and spectrum based processes can both be used. The spectrum based processes can be used at certain times to determine the absolute distance to the target (e.g., distance from the input device to a writing surface), and provide a value of $L_0$. Thereafter, during subsequent time intervals, any of the various I/Q processes can be used to determine ΔL. Additional or alternatively, in some examples, the spectrum based processes using triangle wave modulation of a bias current of a VCSEL can be used as a guide for the I/Q time domain processes. The I/Q processes can operate optimally in the case that $J_1(b)=J_2(b)$, so that the I and Q components can have the same amplitude. However, b can depend on the distance L. In some examples, a triangle wave modulation can be applied to the VCSEL's bias current to determine a distance to a point of interest. Then this distance can be used to find the optimal peak-to-peak sinusoidal modulation of the bias current to use in an I/Q approach. Such a dual method approach can provide improved signal-to-noise ratio and displacement accuracy obtained from the I/Q method.

Therefore, according to the above, some examples of the disclosure are directed to a stylus. The stylus can comprise a housing; a plurality of self-mixing interferometry (SMI) sensors configured to emit light to and detect light from one or more surfaces; processing circuitry coupled to the plurality of SMI sensors, the processing circuitry configured to compute one or more distances to one or more surfaces and one or more directional velocities; and wireless communication circuitry configured to transmit information from the stylus to an external device configured use the information from the stylus as input. The information can include the one or more distances, the one or more directional velocities, or other information derived from the one or more distances or the one or more directional velocities. Additionally or alternatively to one or more of the examples disclosed above, in some examples, using the information from the stylus as input can comprise rendering writing or drawing strokes of the stylus on a non-touch sensitive surface. Additionally or alternatively to one or more of the examples disclosed above, in some examples, the processing circuitry can be further configured to: compute, using the one or more distances and the one or more directional velocities, a displacement along a first axis, a displacement along a second axis orthogonal to the first axis, a displacement along a third axis orthogonal to the first axis and the second axis, a tilt angle, an orientation angle, and/or an axial angle. Additionally or alternatively to one or more of the examples disclosed above, in some examples, the plurality of SMI sensors can include a first SMI sensor and a second SMI sensor configured to generate orthogonal light beams to measure planar displacement. Additionally or alternatively to one or more of the examples disclosed above, in some examples, the housing of the stylus can include one or more notches. Additionally or alternatively to one or more of the examples disclosed above, in some examples, the plurality of SMI sensors can include a first SMI sensor, a second SMI sensor and a third SMI sensor to measure three-dimensional displacement. Additionally or alternatively to one or more of the examples disclosed above, in some examples, the first SMI sensor, the second SMI sensor and the third SMI sensor can generate beams with 120 degree separation when projected on an external surface. Additionally or alternatively to one or more of the examples disclosed above, in some examples, a tip of the stylus can be formed from opaque material and the tip can include a plurality of windows for beams from the one or more SMI sensors to exit and return to stylus. Additionally or alternatively to one or more of the examples disclosed above, in some examples, a tip of the stylus can be formed from an optically transparent or translucent material. Additionally or alternatively to one or more of the examples disclosed above, in some examples, the tip can include one or more lenses to increase beam power for one or more of the plurality of SMI sensors or improve symmetry of a plurality of beams for the plurality of SMI sensors. Additionally or alternatively to one or more of the examples disclosed above, in some examples, the stylus can further comprise a mechanical component disposed at least partially within the housing and configured to be displaced in response to contact between the stylus and a surface. Additionally or alternatively to one or more of the examples disclosed above, in some examples, the mechanical component can comprise a compliant rod. Additionally or alternatively to one or more of the examples disclosed above, in some examples, the plurality of SMI sensors can include a first SMI sensor and a second SMI sensor configured to measure orthogonal displacement of the compliant rod. Additionally or alternatively to one or more of the examples disclosed above, in some examples, the plurality of SMI sensors can include one SMI sensor to configured to measure axial displacement of the compliant rod in response to force applied to a tip of the stylus. Additionally or alternatively to one or more of the examples disclosed above, in some examples, the mechanical component can further comprise a head for the compliant rod. An area of the head can be greater than an area of the compliant rod in a plane orthogonal to the axial direction of the compliant rod. Additionally or alternatively to one or more of the examples disclosed above, in some examples, the plurality of SMI sensors can include three or more SMI sensors configured to measure displacement of the compliant rod in three dimensions in response to a force applied to a tip of the stylus. Additionally or alternatively to one or more of the examples disclosed above, in some examples, the mechanical component can comprises a trackball and the plurality of SMI sensors can include a first SMI sensor and a second SMI sensor configured to measure orthogonal rotation of the trackball. Some examples of the disclosure are directed to a method of operating the stylus described herein or a non-transitory computer readable storage medium storing instructions configured to be executed by one or more processors of the stylus to cause the processor(s) to perform any of the above operations of the stylus.

Some examples of the disclosure are directed to a system. The system can comprise: a first device comprising: a plurality of first sensors configured to track displacement of the first device in contact with a non-touch sensitive surface, the plurality of first sensors comprising a plurality of self-mixing interferometry (SMI) sensors; and first communication circuitry coupled to the plurality of first sensors and configured to transmit information from the plurality of first sensors to a second device. The system can comprise the second device, the second device comprising: one or more second sensors configured to track a position of the first device with respect to the non-touch sensitive surface; second communication circuitry configured to receive the information from the plurality of first sensors; processing circuitry configured to generate content using the position of the first device with respect to the non-touch sensitive surface and using the displacement of the first device in contact with the non-touch sensitive surface; and a display configured to display the content generated by the processing circuitry on the non-touch sensitive surface. Additionally or alternatively to one or more of the examples disclosed above, in some examples, the first device can be a stylus and the second device can be a head-mounted display device. Additionally or alternatively to one or more of the examples disclosed above, in some examples, the one or more second sensors can comprise a camera and the second device can track the position of the first device by detecting light emitted by the first device. Additionally or alternatively to one or more of the examples disclosed above, in some examples, the one or more sensors can comprise a magnetic sensor or an audio sensor or an electromagnetic sensor configured to track the position of the first device with respect to the non-touch sensitive surface using changes in magnetic field, acoustic field, or electromagnetic field. Additionally or alternatively to one or more of the examples disclosed above, in some examples, the first device can comprise a camera and the second device comprises a light emitter. The system can further track the position of the first device or the displacement of the first device based on a pattern of light emitted by the second device and detected by the camera of the first device. Additionally or alternatively to one or more of the examples disclosed above, in some examples, generating content using the position of the first device with respect to the non-touch sensitive surface and using the displacement of the first device in contact with the non-touch sensitive surface can comprise matching an absolute initial position of the first device as the position of the device in contact with the non-touch sensitive at a first time and generating a stroke relative to the absolute initial position using on relative motion of the first device from the first time to a second time derived from the displacement of the first device from the absolute initial position. Additionally or alternatively to one or more of the examples disclosed above, in some examples, tracking the displacement of the first device can be augmented using one or more additional sensors including an accelerometer in the first device, a gyroscope in the first device, and inertial measurement unit in the first device, or a camera in the second device. Additionally or alternatively to one or more of the examples disclosed above, in some examples, the one or more second sensors can include a camera configured to detect the first device or a hand, and the system can be configured to activate the plurality of first sensors in response to detecting the first device and the hand meeting one or more activation criteria. Additionally or alternatively to one or more of the examples disclosed above, in some examples, the plurality of first sensors can be further configured to track a distance of the first device from the non-touch sensitive surface and the system can detect the contact of the first device with the non-touch sensitive surface based on the distance. Additionally or alternatively to one or more of the examples disclosed above, in some examples, the plurality of first sensors can be further configured to track a distance of the first device from the non-touch sensitive surface and the system can detect a break in the contact of the first device with the non-touch sensitive surface based on the distance. Additionally or alternatively to one or more of the examples disclosed above, in some examples, the system can determine an amount of force applied by the first device to the non-touch sensitive surface using displacement of the first device. Some examples of the disclosure are directed to a method of operating the system described herein or a non-transitory computer readable storage medium storing instructions configured to be executed by one or more processors of the system to cause the processor(s) to perform any of the above operations of the system.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A stylus comprising:
   a housing;
   a plurality of self-mixing interferometry (SMI) sensors configured to emit light to and detect light from one or more surfaces, wherein the plurality of SMI sensors includes a first SMI sensor, a second SMI sensor and a third SMI sensor, wherein the first SMI sensor, the second SMI sensor and the third SMI sensor generate beams with 120 degree separation when projected on a non-touch sensitive external surface;
   processing circuitry coupled to the plurality of SMI sensors, the processing circuitry configured to compute one or more distances to one or more surfaces and one or more directional velocities; and
   wireless communication circuitry configured to transmit information from the stylus to an external device configured to use the information from the stylus as input, wherein the information includes the one or more distances, the one or more directional velocities, or other information derived from the one or more distances or the one or more directional velocities.

2. The stylus of claim 1, wherein using the information from the stylus as input comprises rendering writing or drawing strokes of the stylus on the non-touch sensitive external surface.

3. The stylus of claim 1, wherein the processing circuitry is further configured to:
   compute, using the one or more distances and the one or more directional velocities, a first displacement along a first axis, a second displacement along a second axis orthogonal to the first axis, a third displacement along a third axis orthogonal to the first axis and the second axis, a tilt angle, an orientation angle, or an axial angle.

4. The stylus of claim 1, first SMI sensor and the second SMI sensor are configured to generate orthogonal light beams to measure planar displacement.

5. The stylus of claim 1, wherein a tip of the stylus is formed from opaque material and the tip includes a plurality of windows for beams from the one or more SMI sensors to exit and return to stylus.

6. The stylus of claim 1, wherein a tip of the stylus is formed from an optically transparent or translucent material.

7. The stylus of claim 6, wherein the tip includes one or more lenses to increase beam power for one or more of the plurality of SMI sensors or improve symmetry of a plurality of beams for the plurality of SMI sensors.

8. The stylus of claim 1, further comprising:
   a mechanical component disposed at least partially within the housing and configured to be displaced in response to contact between the stylus and a surface of the one or more surfaces.

9. The stylus of claim 8, wherein the mechanical component comprises a compliant rod.

10. The stylus of claim 9, wherein the plurality of SMI sensors includes three or more SMI sensors configured to measure displacement of the compliant rod in three dimensions in response to a force applied to a tip of the stylus.

11. The stylus of claim 1, wherein a first respective beam exiting the stylus housing generated by the first SMI sensor is oriented away from an axis extending parallel to the housing of the stylus.

12. A system comprising:
   a first device comprising:
      a plurality of first sensors configured to track displacement of the first device in contact with a non-touch sensitive surface, wherein the plurality of first sensors comprises a plurality of self-mixing interferometry (SMI) sensors, wherein the plurality of SMI sensors includes a first SMI sensor, a second SMI sensor and a third SMI sensor, wherein the first SMI sensor, the second SMI sensor and the third SMI sensor generate beams with 120 degree separation when projected on an external surface; and
      first communication circuitry coupled to the plurality of first sensors and configured to transmit information from the plurality of first sensors to a second device; and
   the second device comprising:
      one or more second sensors configured to track a position of the first device with respect to the non-touch sensitive surface;
      second communication circuitry configured to receive the information from the plurality of first sensors;
      processing circuitry configured to generate content using the position of the first device with respect to the non-touch sensitive surface and using the displacement of the first device in contact with the non-touch sensitive surface; and
      a display configured to display the content generated by the processing circuitry on the non-touch sensitive surface.

13. The system of claim 12, wherein the first device is a stylus and the second device is a head-mounted display device.

14. The system of claim 12, wherein the one or more second sensors comprises a camera and wherein the second device tracks the position of the first device by detecting light emitted by the first device.

15. The system of claim 12, wherein the one or more sensors comprises a magnetic sensor or an audio sensor or an electromagnetic sensor configured to track the position of the first device with respect to the non-touch sensitive surface using changes in magnetic field, acoustic field, or electromagnetic field.

16. The system of claim 12, wherein the first device comprises a camera and the second device comprises a light emitter, wherein the system is configured to track the position of the first device or the displacement of the first device based on a pattern of light emitted by the second device and detected by the camera of the first device.

17. The system of claim 12, wherein generating content using the position of the first device with respect to the non-touch sensitive surface and using the displacement of the first device in contact with the non-touch sensitive surface comprises matching an absolute initial position of the first device as the position of the first device in contact with the non-touch sensitive surface at a first time, and generating a stroke relative to the absolute initial position using on relative motion of the first device from the first time to a second time derived from the displacement of the first device from the absolute initial position.

18. The system of claim 12, wherein tracking the displacement of the first device is augmented using one or more additional sensors including an accelerometer in the first device, a gyroscope in the first device, and inertial measurement unit in the first device, or a camera in the second device.

19. The system of claim 12, wherein the one or more second sensors comprises a camera configured to detect the first device or a hand, and the system is configured to activate the plurality of first sensors in response to detecting the first device or the hand meeting one or more activation criteria.

20. The system of claim 12, wherein the plurality of first sensors are further configured to track a distance of the first device from the non-touch sensitive surface and wherein the system detects the contact of the first device with the non-touch sensitive surface based on the distance.

21. The system of claim 12, wherein the plurality of first sensors are further configured to track a distance of the first device from the non-touch sensitive surface and wherein the system detects a break in the contact of the first device with the non-touch sensitive surface based on the distance.

22. The system of claim 12, wherein the system determines an amount of force applied by the first device to the non-touch sensitive surface using displacement of the first device.

\* \* \* \* \*